US007079338B1

(12) United States Patent
Semba et al.

(10) Patent No.: US 7,079,338 B1
(45) Date of Patent: Jul. 18, 2006

(54) DUAL-STAGE ACTUATOR DISK DRIVE WITH METHOD FOR SECONDARY-ACTUATOR FAILURE DETECTION AND RECOVERY WHILE TRACK-FOLLOWING

(75) Inventors: Tetsuo Semba, San Jose, CA (US); Matthew T. White, Mountain View, CA (US); Satoshi Yamamoto, San Jose, CA (US)

(73) Assignee: Hitachi Global StorageTechnologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/145,444

(22) Filed: Jun. 3, 2005

(51) Int. Cl.
*G11B 27/36* (2006.01)
*G11B 21/02* (2006.01)
(52) U.S. Cl. .......................... 360/31; 360/75
(58) Field of Classification Search .................. None
See application file for complete search history.

(56) References Cited

U.S. PATENT DOCUMENTS

| 5,936,805 | A | | 8/1999 | Imaino |
| 5,959,808 | A | | 9/1999 | Fan et al. |
| 6,088,187 | A | * | 7/2000 | Takaishi .................. 360/78.05 |
| 6,292,320 | B1 | * | 9/2001 | Mason et al. .................. 360/63 |
| 6,483,659 | B1 | * | 11/2002 | Kobayashi et al. ...... 360/78.04 |
| 6,611,399 | B1 | | 8/2003 | Mei et al. |
| 6,768,610 | B1 | * | 7/2004 | Morris et al. ............ 360/78.07 |
| 2005/0122607 | A1 | * | 6/2005 | Zhu et al. ..................... 360/31 |

OTHER PUBLICATIONS

L.S. Fan et al., "Electrostatic Microactuator and Design Considerations for HDD Applications", IEEE Transactions on Magnetics, vol. 35, No. 2, Mar. 1999, pp. 1000-1005.
Y. Lou et al., "Dual-Stage Servo With On-Slider PZT Microactuator for Hard Disk Drives", IEEE Transactions on Magnetics, vol. 38, No. 5, Sep. 2002, pp. 2183-2185.
T. Semba et al., "Dual-stage servo controller for HDD using MEMS microactuator", IEEE Transactions on Magnetics, vol. 35, Sep. 1999, pp. 2271-2273.
M. T. White et al., "Use of the Relative Position Signal for Microactuators in Hard Disk Drives", Proceedings of the American Control Conference, Denver, Colorado, Jun. 4-6, 2003, pp. 2535-2540.

* cited by examiner

*Primary Examiner*—K. Wong
*Assistant Examiner*—Mitchell Slavitt
(74) *Attorney, Agent, or Firm*—Thomas R. Berthold

(57) ABSTRACT

A method in a dual-stage actuator disk drive tests if the secondary actuator has failed while the disk drive is in its normal track-following operating mode. The secondary actuator is removed from the control loop and the primary actuator maintains the read/write head on a data track in the track-following mode. The servo control processor generates a test signal to the secondary actuator and receives the position error signal (PES) as the read head detects the PES bursts in the data track being followed. The servo control processor calculates the response of the secondary actuator to the test signal by deconvolving the motion of the primary actuator from the PES. The calculated response is then compared with an expected response to determine if the secondary actuator has failed. The coherence function can be calculated to measure the statistical validity of the calculated secondary-actuator frequency response.

22 Claims, 19 Drawing Sheets

DUAL-STAGE ACTUATOR DISK DRIVE WITH METHOD FOR SECONDARY-ACTUATOR FAILURE DETECTION AND RECOVERY WHILE TRACK-FOLLOWING

RELATED APPLICATION

This application is related to concurrently-filed co-pending application Ser. No. 11/145,445 and titled "DUAL-STAGE ACTUATOR DISK DRIVE WITH METHOD FOR SECONDARY-ACTUATOR FAILURE DETECTION AND RECOVERY USING A RELATIVE-POSITION SENSOR WHILE TRACK FOLLOWING".

BACKGROUND OF THE INVENTION

1. Field of the Invention

This invention relates generally to magnetic recording hard disk drives, and more particularly to a disk drive with a dual-stage actuator for positioning the read/write heads.

2. Description of the Related Art

Magnetic recording hard disk drives with dual-stage actuators for positioning the read/write heads on the disks have been proposed. A rotary voice-coil-motor (VCM) is typically the primary actuator, with the secondary actuator attached to the VCM and the read/write heads attached to the secondary actuator. A servo control system receives servo positioning information read by the read/write heads from the data tracks and generates control signals to the primary and secondary actuators to maintain the heads on track and move them to the desired tracks for reading and writing of data. As in conventional single-stage actuator disk drives, each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm. The secondary actuator is typically a piezoelectric or electrostatic milliactuator or microactuator located on the VCM actuator arm for driving the suspension, or on the suspension between the suspension and the slider for driving the slider, or on the slider for driving just the read/write head.

The conventional servo control system for a typical dual-stage actuator disk drive uses a controller designed to assure stability of the VCM with adequate stability margins as if it were to operate without the secondary actuator. Then the controller for the secondary actuator is designed to achieve the desired combined dual-stage bandwidth. The secondary-actuator control loop and the combined dual-stage control loop are also designed to ensure adequate stability separately and jointly with the other control loops. This type of servo control system is satisfactory for limited increases in the bandwidth above what is achievable with only the VCM.

In co-pending application Ser. No. 10/802,601 filed Mar. 16, 2004, titled "MAGNETIC RECORDING DISK DRIVE WITH DUAL-STAGE ACTUATOR AND CONTROL SYSTEM WITH MULTIPLE CONTROLLERS", and assigned to the same assignee as this application, a dual-stage actuator disk drive is described that operates with an improved servo control system that has two controllers. One controller is a dual-stage controller that simultaneously generates a primary actuator control signal and a secondary-actuator control signal, and uses a degraded-stability primary actuator controller design with relatively high low-frequency open-loop gain and a secondary-actuator controller design that provides stability and high mid-frequency to high-frequency open-loop gain resulting in increased bandwidth. The other controller is a single-stage controller that generates only a primary actuator control signal and uses a stable VCM-only controller design. If a potential failure of the secondary actuator is detected, the servo control system selects the single-stage controller.

In dual-stage actuator disk drives with either the conventional servo control system or the control system of the co-pending application, a failure of the secondary actuator will result in reduced performance and may lead to loss of data and/or failure of the disk drive. In the related co-pending application Ser. No. 10/997,153 filed Nov. 24, 2004, titled "DISK DRIVE WITH A DUAL-STAGE ACTUATOR AND FAILURE DETECTION AND RECOVERY SYSTEM FOR THE SECONDARY ACTUATOR", and assigned to the same assignee as this application, a secondary-actuator failure detection test is performed by generating a test signal to the secondary actuator and measuring a calibration signal from the read head as the read head detects test blocks in special calibration tracks located on the disk. If the calibration signal indicates only reduced performance of the secondary actuator from which failure is recoverable, the controller parameters are adjusted. However, the writing of the special calibration tracks containing the test blocks increases the time and cost of the servowriting process.

In the related co-pending application Ser. No. 11/051,392 filed Feb. 3, 2005, titled "DUAL-STAGE ACTUATOR DISK DRIVE WITH SECONDARY ACTUATOR FAILURE DETECTION AND RECOVERY USING RELATIVE-POSITION SIGNAL", and assigned to the same assignee as this application, a secondary-actuator failure detection test is performed by generating a test signal to the secondary actuator while the primary actuator is biased at a test location, such as a crash stop or a load/unload ramp. The secondary actuator has a relative-position sensor that generates a relative-position signal (RPS) indicating the position of the secondary actuator relative to its neutral position. The servo control processor generates a test signal to the secondary actuator and receives a relative-position signal (RPS) from the relative-position sensor in response to the test signal. If the RPS indicates only reduced performance of the secondary actuator from which failure is recoverable, the controller parameters are adjusted. However, this method of recovery requires that the primary actuator be driven to the crash stop or load/unload ramp before the test can be performed.

What is needed is a dual-stage actuator disk drive with a method for secondary-actuator failure-detection and recovery that can be performed while the disk drive is in its normal operating mode of track-following on a data track.

SUMMARY OF THE INVENTION

The invention is a method in a dual-stage actuator disk drive for testing if the secondary actuator has failed while the disk drive is in its normal track-following operating mode. The secondary-actuator failure detection test can be performed on a regular schedule or at selected times, such as at disk drive start-up. The secondary actuator is removed from the control loop and the primary actuator maintains the read/write head on a data track in the track-following mode. The servo control processor then generates a test signal to the secondary actuator and receives the PES as the read head detects the PES bursts in the data track being followed. The servo control processor calculates the response of the secondary actuator to the test signal by deconvolving the motion of the primary actuator from the PES. The calculated response is then compared with an expected response to determine if the secondary actuator has failed. In the preferred embodiment the test comprises two measurements: a measurement of the secondary-actuator static characteristics, and a measurement of the secondary-actuator dynamic characteristics. Either test alone can be used to determine secondary-actuator failure, but the dynamic characteristics test can also be used to modify the controller parameters in the event that the secondary actuator has not failed but minor changes in the secondary-actuator dynamic characteristics have occurred.

The static characteristics measurement is a calculation of the secondary-actuator "stroke", i.e., the amount of secondary-actuator movement as a function of voltage input to the secondary actuator, and a comparison of the calculated stroke to a predetermined range of acceptable stroke values. With the secondary actuator removed from the control loop and with the read/write head maintained on a data track by the primary actuator, a static test signal, e.g., a fixed bias voltage, is applied to the secondary actuator. The servo control processor receives the PES response to this static test signal and generates a control signal to the primary actuator to move the read/write head back on track. The change on the primary actuator control signal can be used to calculate the stroke of the secondary actuator. Alternatively, if the secondary actuator includes a relative-position sensor then the relative-position signal (RPS) response to this static test signal can be used to calculate the stroke of the secondary actuator. If the calculated stroke is outside the acceptable range, then this is an indicator that the secondary actuator has likely failed.

If the calculated stroke is within the acceptable range, then the dynamic characteristics measurement can be made. This measurement is essentially a calculation of the plant frequency response of the secondary actuator. With the secondary actuator removed from the control loop and the primary actuator maintaining the read/write head in track-following mode, a dynamic test signal is applied to the secondary actuator and the servo control processor calculates the response of the secondary actuator to the dynamic test signal by deconvolving the motion of the primary actuator from the PES. The test signal for the dynamic characteristics measurement is a series of dynamic test signals, each a sinusoidal signal at a constant frequency. The PES is detected during the application of the constant-frequency test signal. A deconvolution routine is run that removes the motion of the primary actuator from the PES, resulting in the response of the secondary actuator. The resulting gain and phase of the response are recorded along with the corresponding frequency. This is repeated for each frequency in the series of dynamic test signals. This enables the plant frequency response of the secondary actuator to be measured. If the response is significantly different from the expected response, it is virtually assured that the secondary actuator has failed. If the measured frequency response shows minor changes, such as a minor increase or decrease in the gain, or a minor shift in the frequency at which the maximum gain occurs, the controller parameters are adjusted or re-optimized. This re-optimization changes the values of the controller parameters in the memory accessible by the servo control processor. The parameters that can be changed include parameters that affect bandwidth or stability margins, notching of particular frequencies such as the secondary-actuator resonant frequency, active damping of the secondary-actuator resonance, or other performance, robustness, or stability metrics.

As an optional part of the dynamic characteristics test, the coherence function is used as a measure of the statistical validity of the frequency response measurement of the secondary actuator. The coherence indicates the linear dependence of the output signal (the secondary-actuator response deconvolved from the measured PES) to the input signal (the dynamic test signal) as a function of frequency. For each dynamic test signal in the series the coherence is calculated and the weighted average of the calculated coherences is compared to an acceptable value. If the coherence is not acceptable then a secondary-actuator failure signal can be posted and the dynamic characteristics test terminated without comparing the gain to expected gain values. Alternatively, techniques to improve the frequency response measurement may be used, such as changing the amplitude of the input signal or changing the bandwidth of the VCM control loop.

The invention is applicable to both the dual-stage actuator disk drive with a servo control system having a conventional dual-stage controller, and the dual-stage actuator disk drive according to the previously-cited co-pending application Ser. No. 10/802,601 that has both a dual-stage controller and a selectable single-stage controller.

In the dual-stage actuator disk drive according to the co-pending application Ser. No. 10/802,601, a potential failure of the secondary actuator is detected either by providing a model of the dynamic response of the primary and secondary actuators and comparing the modeled head-position with the measured head-position, or by measuring the relative position of the secondary actuator with the relative-position sensor and comparing the relative position to a modeled position of the secondary actuator. Upon detection of a potential failure of the secondary actuator, the single-stage controller is selected, the primary actuator maintains the read/write head in track-following mode, and the secondary-actuator failure detection and calibration test is run. If the secondary actuator passes both the static characteristics measurement test and the dynamic characteristics measurement test, then the dual-stage controller is re-selected. If the measured frequency response shows minor changes from the optimized frequency response, the controller parameters are adjusted or re-optimized prior to re-selection of the dual-stage controller.

For a fuller understanding of the nature and advantages of the present invention, reference should be made to the following detailed description taken together with the accompanying figures.

DETAILED DESCRIPTION OF THE INVENTION

Prior Art

Figure 1A:
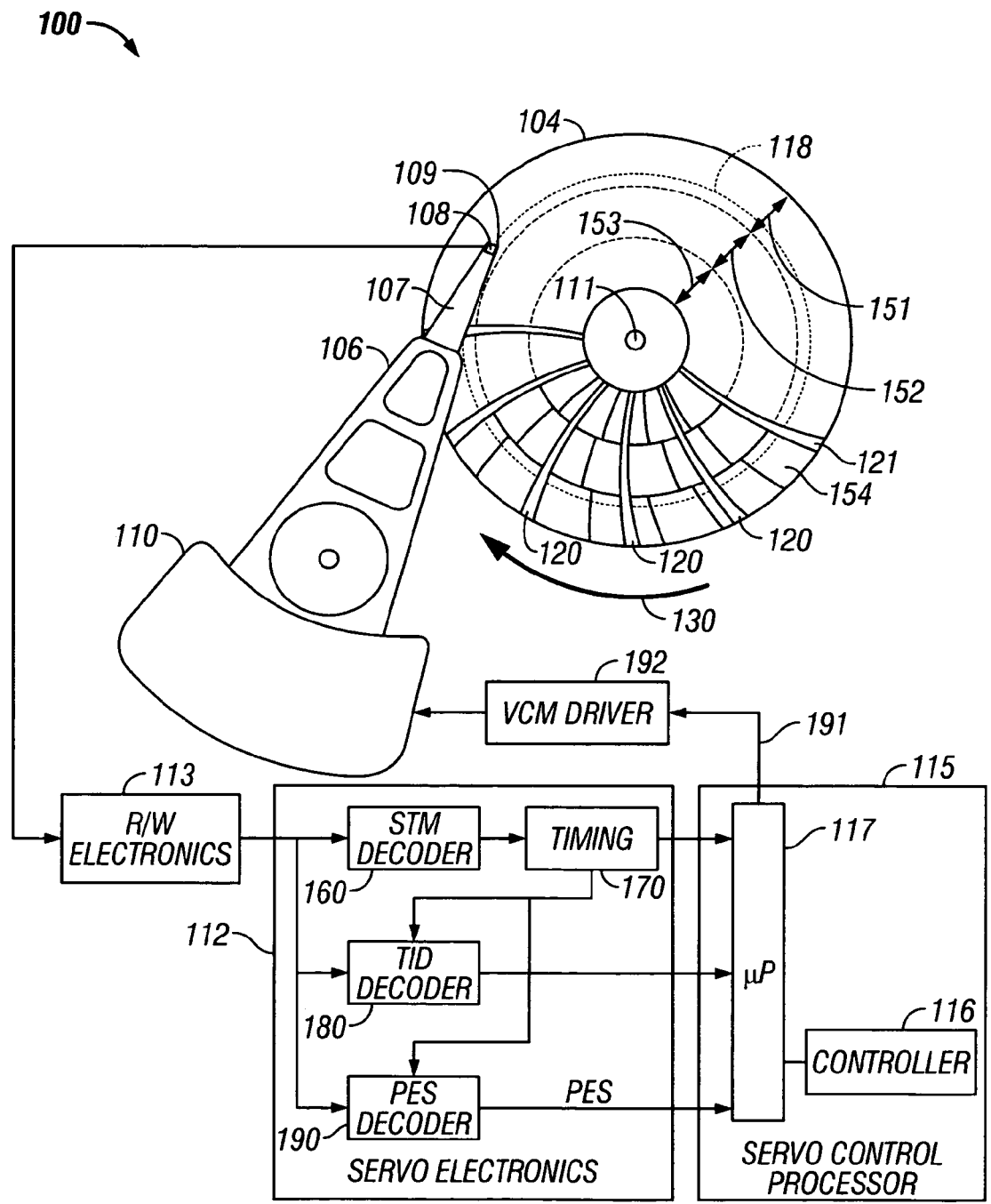
FIG. 1A is a block diagram of a prior art single-stage actuator disk drive.

FIG. 1A is a block diagram of a conventional single-stage-actuator disk drive that uses servo positioning information located in angularly-spaced servo sectors for positioning the read/write heads. The disk drive, designated generally as 100, includes data recording disk 104, a voice coil motor (VCM) 110 as the primary and only actuator, an actuator arm 106, a suspension 107, a head carrier or air-bearing slider 108, a data recording transducer 109 (also called a head, recording head or read/write head), read/write electronics 113, servo electronics 112, and servo control processor 115.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 104. Typically, there are multiple disks stacked on a hub that is rotated by a disk motor, with a separate slider and recording head associated with each surface of each disk.

Data recording disk 104 has a center of rotation 111 and is rotated in direction 130. The disk 104 has a magnetic recording layer with radially-spaced concentric data tracks, one of which is shown as track 118. The disk drive in FIG. 1A is illustrated as a zone-bit-recording (ZBR) disk drive because the data tracks are grouped radially into a number of annular data zones or bands, three of which are shown as bands 151, 152 and 153, but the invention is fully applicable to a disk drive that does not use ZBR, in which case the disk drive would have only a single data band. Each data track has a reference index 121 indicating the start of track. Within each band, the tracks are also circumferentially divided into a number of data sectors 154 where user data is stored. If the disk drive has multiple heads, then the set of tracks which are at the same radius on all disk recording layers is referred to as a "cylinder".

Each data track also includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120.

Figure 1B:
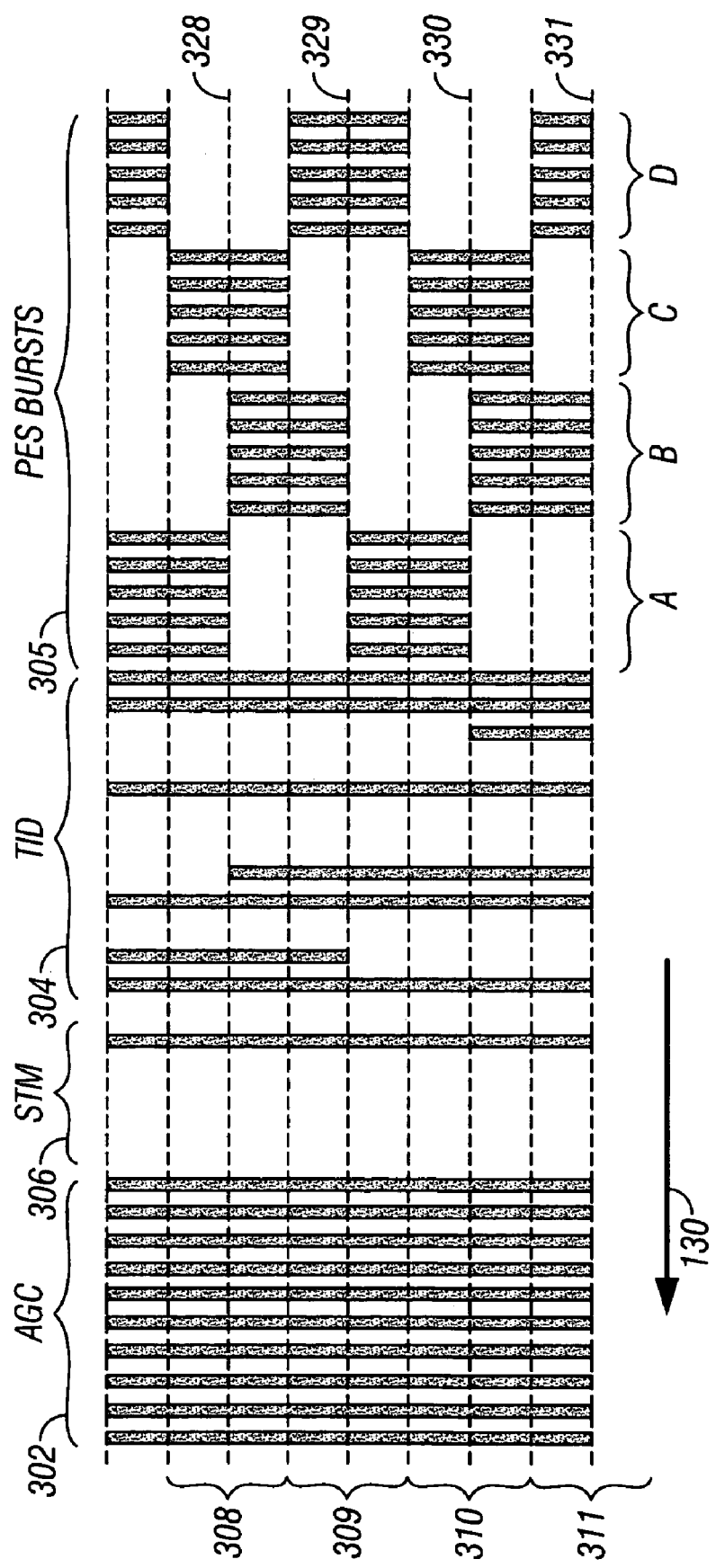
FIG. 1B is a view of a prior art servo pattern in the servo sectors of four adjacent tracks and shows a quad-burst position error signal (PES) pattern.

FIG. 1B is a schematic showing the servo positioning information contained in each servo sector. FIG. 1B is a conventional servo pattern of the type commonly used in sector servo systems and shows a greatly simplified pattern for clarity with several tracks in one of the servo sections 120 (full tracks 308, 309, 310 and half-track 311, each having a respective track centerline 328, 329, 330 and 331). The servo pattern moves relative to head 109 in the direction shown by arrow 130. The two possible magnetic states of the medium are indicated as black and white regions. The servo pattern is comprised of four distinct fields: automatic gain control (AGC) field 302, servo-timing-mark (STM) field 306, track ID (TID) field 304 and position-error-signal (PES) field 305 depicted as the well-known quad-burst pattern of bursts A–D.

The AGC field 302 is a regular series of transitions and is nominally the same at all radial positions. The AGC field 302 allows the servo control processor 115 to calibrate timing and gain parameters for later fields.

The servo timing mark (STM) field 306 serves as a timing reference for reading the subsequent servo information in track identification (TID) field 304 and position error signal (PES) field 305. The STM is also referred to as a servo address mark or servo start mark.

The TID field 304 contains the track number, usually Gray-coded and written as the presence or absence of recorded dibits. The TID field 304 determines the integer part of the radial position of head 109.

The position error signal (PES) field 305 contains PES bursts A–D that are used to determine the fractional part of the radial position of the head. Each PES burst comprises a series of regularly spaced magnetic transitions. The PES bursts are arranged radially such that a burst of transitions are one track wide and two tracks apart, from centerline to centerline. The A and B bursts are the main bursts because when the head is at the track centers the read-back signal amplitudes from A and B are equal. When the head is at the half-track positions the amplitudes from C and D are equal. The PES bursts are offset from their neighbors such that when the head is centered over an even-numbered track (e.g., track 310 with centerline 330) the read-back signal from bursts A and B are equal. As the head moves off-track in a direction toward track 309, for example, the read-back signal from burst A increases and the read-back signal from burst B decreases until, with the head half-way between track centerlines 330 and 329 the read-back signals from bursts C and D are equal, the read-back signal from burst A is maximized and the read-back signal from burst B is minimized. As the head continues to move in the same direction the read-back signal from burst B increases and the read-back signal from burst A decreases until, with the head centered over the next track (with centerline 329) the read-back signal from burst C is minimized, the read-back signal from burst D is maximized and the read-back from signals from bursts A and B are again equal.

Referring again to FIG. 1A, the servo positioning information in the servo sectors is read by the read/write electronics 113 and signals are input to the servo electronics 112. The servo electronics 112 provides digital signals to servo control processor 115. The servo control processor 115 provides an output 191 to VCM driver 192 that controls current to the VCM 110 to position the head 109.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector.

After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the analog signal from the read head as the read head detects the PES bursts and passes a position error signal (PES) to servo control processor 115.

The servo control processor 115 includes a microprocessor 117 that uses the PES as input to a control algorithm to generate the control signal 191 to VCM driver 192. The control algorithm recalls from memory a "controller" 116, which is a set of parameters based on the static and dynamic characteristics of the "plant" being controlled, i.e., the VCM 110. The controller 116 is a "single-stage" controller because the disk drive being described has only a primary actuator, i.e., VCM 110, and servo control processor 115 provides only a single output, i.e., signal 191 to VCM driver 192. The control algorithm is essentially a matrix multiplication algorithm, and the controller parameters are coefficients used in the multiplication and stored in memory accessible by the microprocessor 117.

Figure 2:
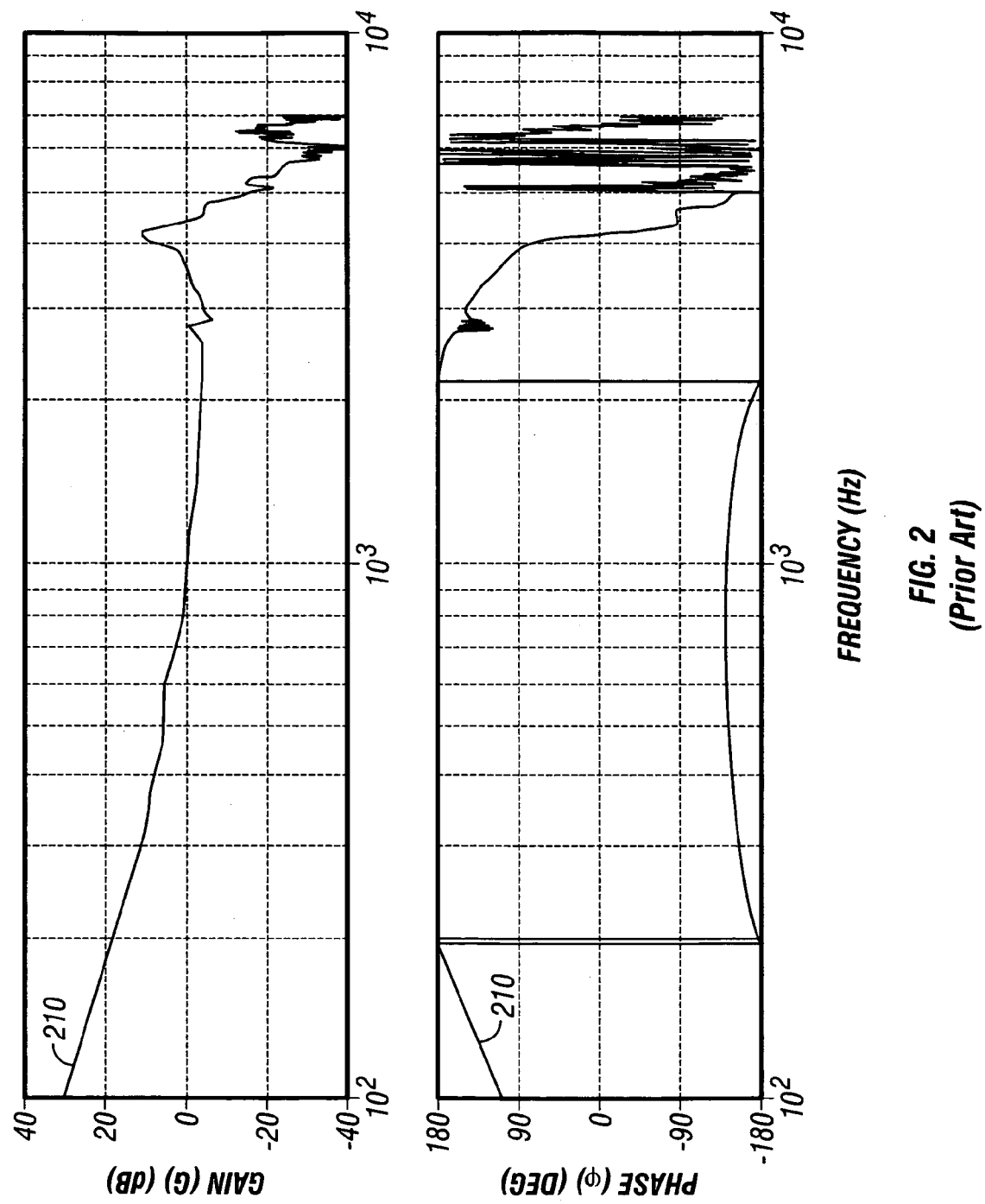
FIG. 2 is an open-loop frequency response for a prior art disk drive with only a single-stage actuator, typically a voice-coil-motor (VCM).

The method of designing the controller 116 is well-known in the digital servo control and disk drive servo control literature. The controller can be designed in the frequency domain to achieve the desired open-loop input-output frequency response of the VCM 110. The input-output behavior of a dynamic system at any frequency can generally be expressed by two parameters, the gain (G) and the phase ($\phi$) representing the amount of attenuation/magnification and phase-shift, respectively. The gain and phase of a dynamic system represent the frequency response of the system and can be generated by experiment. In disk drive single-stage servo control systems the controller 116 must be a stable design. FIG. 2 is an example of an open-loop frequency response 210 for a disk drive with only a single-stage actuator, i.e., VCM 110. The single-stage controller 116 for this system assures stability. For example, at the gain zero-crossover, the phase margin is about 30 degrees and at −180 degree phase the gain margin is about 5 dB. Also, at a natural resonance near 4 kHz, the phase is near zero such that the system is phase stable.

Figure 3:
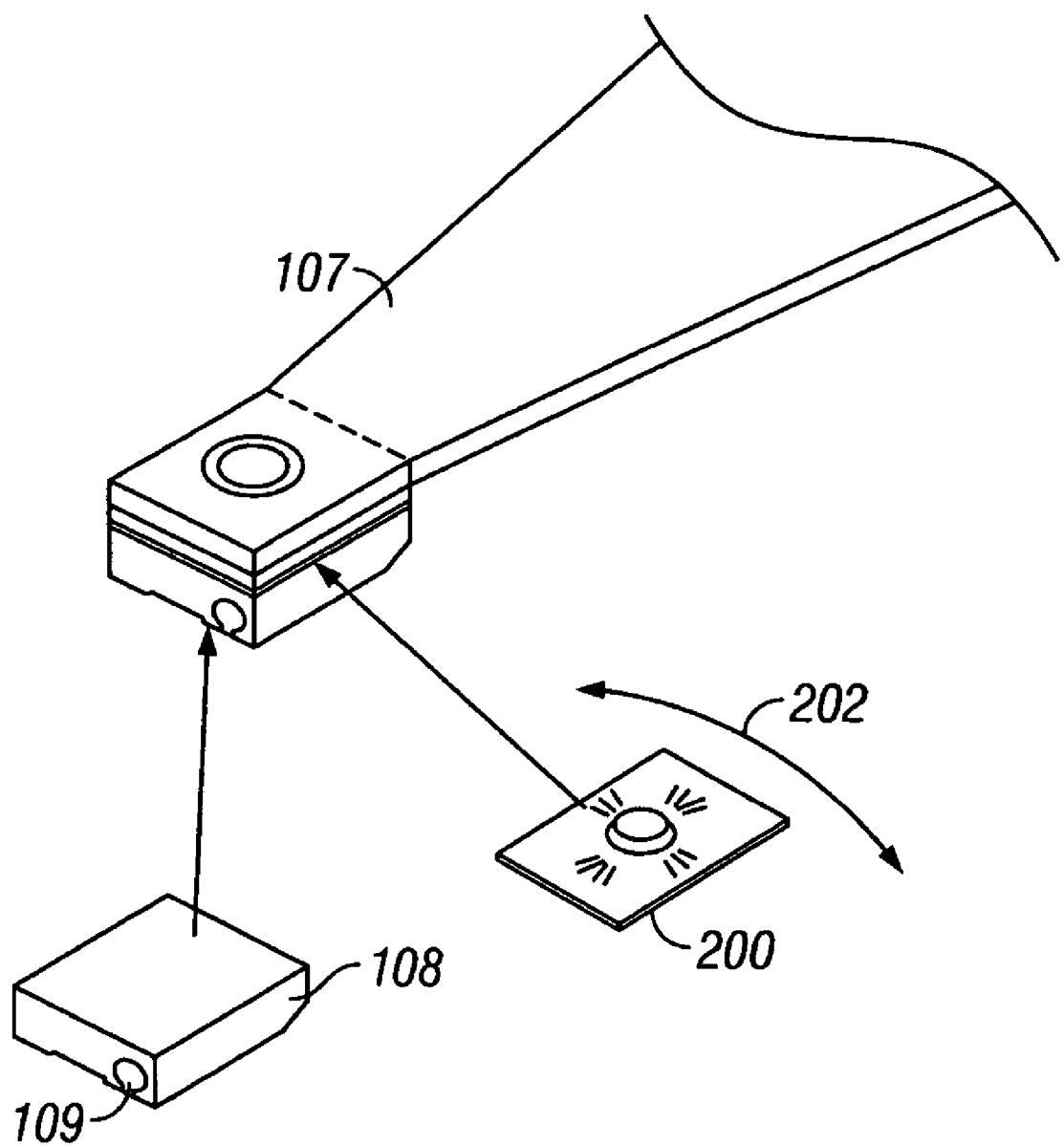
FIG. 3 is a view of a secondary actuator usable with the above-described prior art disk drive.

FIG. 3 shows one example of a secondary actuator usable with the above-described disk drive wherein the secondary actuator is a rotary microactuator 200 located between the slider 108 and the suspension 107. Rotation of the microactuator 200 as represented by arrow 202 causes rotation of the slider 108 and thus movement of head 109 in the cross-track direction. The microactuator 200 maintains the head 109 on-track, while the VCM 110 moves the slider 108 (and thus head 109) across the tracks. Other types of secondary actuators are also well-known, such as piezoelectric-based actuators. Also, the secondary actuator may be located on the suspension or actuator arm to move a suspension or arm-section relative to the fixed actuator arm, as in U.S. Pat. No. 5,936,805, or between the slider and a slider-segment to move the head relative to the slider, as in U.S. Pat. No. 6,611,399. The secondary actuator may also include a relative-position sensor for measuring the position of the secondary actuator relative to its neutral position.

Figure 3A:
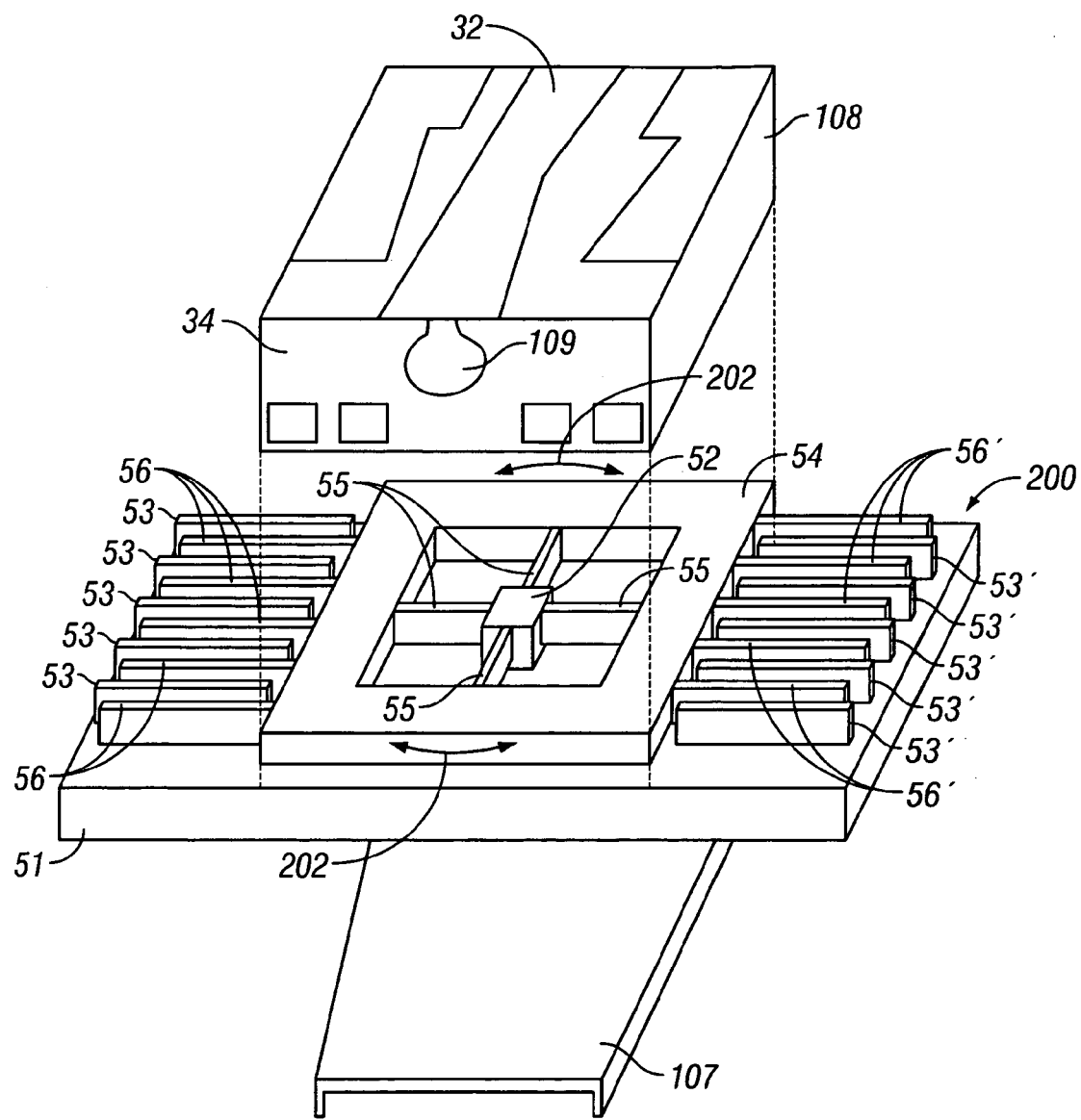
FIG. 3A is an exploded view illustrating the relationship and operation of a prior art rotary electrostatic microactuator, a slider and a suspension.

FIG. 3A is an exploded view of microactuator 200, the disk drive suspension 107, and the air-bearing slider 108. The slider 108 has an air-bearing surface 32 that faces the disk of the disk drive and a trailing surface 34 that supports the read/write head 109. The microactuator 200 depicted in FIG. 3A is a rotary electrostatic microactuator as described in detail in U.S. Pat. No. 5,959,808 and L. S. Fan et al., "Electrostatic Microactuator and Design Considerations for HDD Applications", *IEEE Transactions on Magnetics*, Vol. 35, No. 2, March 1999, pp. 1000–1005. The rotary electrostatic microactuator 200 comprises fixed and movable portions on an insulating substrate 51, which is typically a silicon base with an insulating surface layer, such as a layer of polyimide, silicon oxide or silicon nitride. The substrate 51 is mounted to the end of the suspension 107. The fixed portion of the microactuator 200 includes a central post 52 fixed to substrate 51 and two sets of stationary electrodes 53, 53' also fixed to substrate 51. The movable rotary portion of the microactuator 200 includes a support frame 54, a plurality of flexible members or springs 55 connecting the frame 54 to the fixed post 52, and a plurality of movable electrodes depicted as two sets 56, 56' attached to frame 54. The sets of movable electrodes 56, 56' are interleaved with the sets of fixed electrodes 53, 53', respectively. The frame 54 may optionally support a platform to which the slider 108 is bonded. All of the elements attached to the substrate 51 are formed by lithographically patterning the substrate 51 and depositing electrically conductive material, such as nickel or copper.

A voltage applied to stationary electrodes 53 will apply an electrostatic attractive force between stationary electrodes 53 and movable electrodes 56, tending to cause the frame 54 to rotate counterclockwise. A voltage applied to stationary electrodes 53' will apply an electrostatic attractive force between stationary electrodes 53' and movable electrodes 56', tending to cause the frame 54 to rotate clockwise. Thus a first set of stationary electrodes 53 and movable electrodes 56 are associated with counterclockwise rotation and a second set of stationary electrodes 53' and movable electrodes 56' are associated with clockwise rotation. The frame 54 rotates (as depicted by arrows 202) due to the flexibility of the springs 55 and thus moves the read/write head 109 to maintain its position on a data track on the disk. The rotary electrostatic microactuator shown in FIG. 3A may also include a relative-position sensor in the form of a capacitance sensing circuit, as described in M. T. White and T. Hirano, "Use of the Relative-position signal for Microactuators in Hard Disk Drives", *Proceedings of the American Control Conference*, Denver, Colo., Jun. 4–6, 2003, pp. 2535–2540.

The conventional control system for a disk drive with a dual-stage actuator is similar to that described above except that there is a second output from the servo control processor that is sent to the driver for the secondary actuator, and the controller is a dual-stage controller. In the dual-stage control system, the VCM or primary actuator is typically responsible for large-amplitude, low-frequency motion and the microactuator or secondary actuator is typically responsible for small-amplitude, high-frequency motion. The design of a dual-stage controller for a hard disk drive dual-stage servo control systems is well-known, as described for example, in Y. Lou et al., "Dual-Stage Servo With On-Slider PZT Microactuator for Hard Disk Drives", *IEEE Transactions on Magnetics*, Vol. 38, No. 5, September 2002, pp. 2183–2185; and T. Semba et al., "Dual-stage servo controller for HDD using MEMS microactuator", *IEEE Transactions on Magnetics*, Vol. 35, September 1999, pp. 2271–2273. Generally, the design of a dual-stage controller starts with the VCM controller, typically with a design that is very similar to a single-stage VCM controller, such as the design for the VCM controller whose open-loop frequency response 210 is shown in FIG. 2. In particular, the stability of the VCM is assured with adequate robustness or stability margins as if it were to operate without the secondary actuator. Then the controller for the secondary actuator is designed to achieve the desired combined dual-stage bandwidth. The secondary-actuator control loop and the combined dual-stage control loop are also designed to ensure adequate stability separately and jointly with the other control loops. This process is satisfactory for limited increases in the bandwidth above what is achievable with only the VCM.

Figure 4:
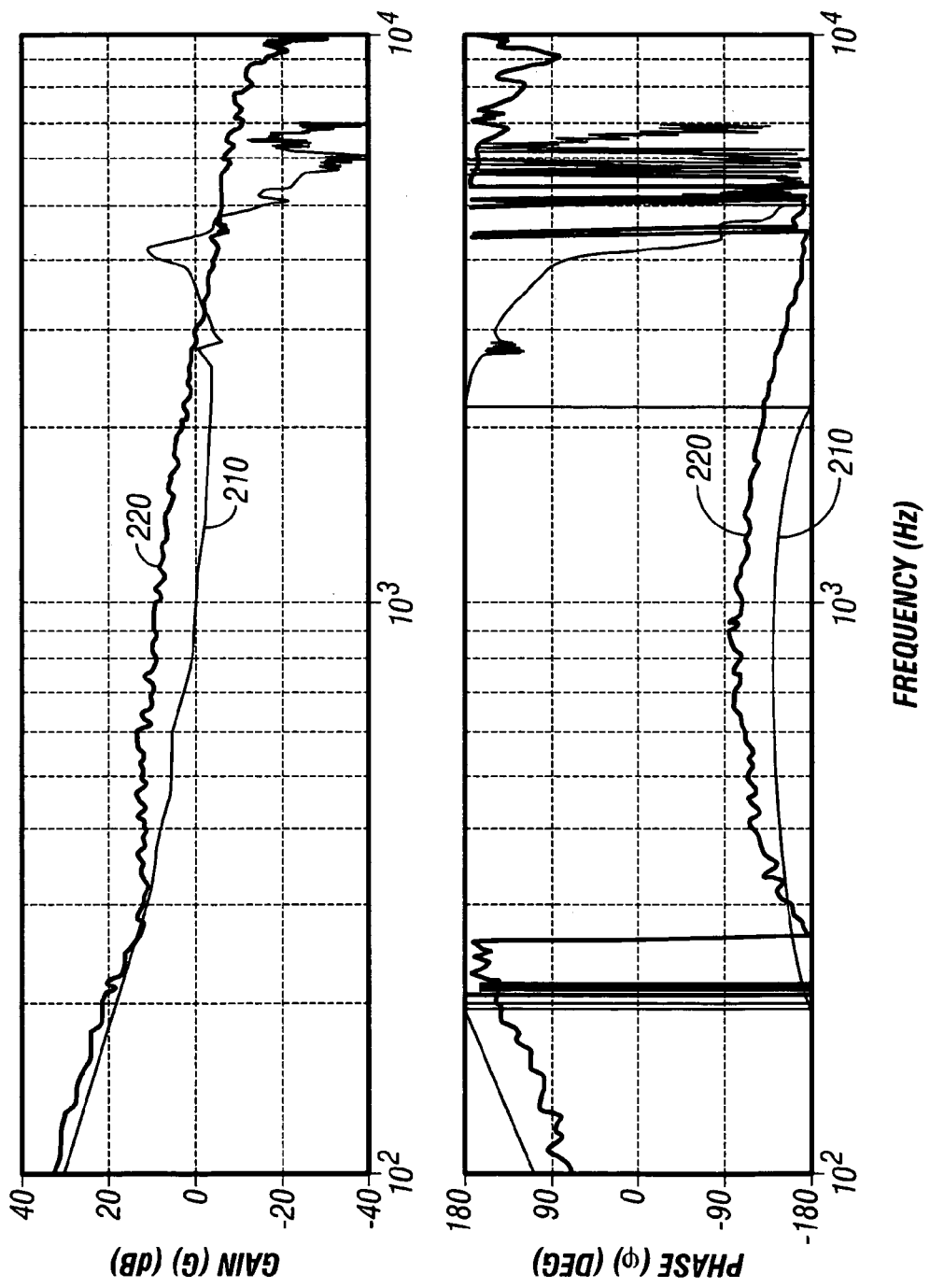
FIG. 4 is a comparison of an open-loop frequency response for a prior art disk drive with a dual-stage actuator with a stable VCM controller design and the open-loop frequency response of FIG. 2.

An example of an open-loop frequency response for a dual-stage hard disk drive with a conventional stable VCM controller design is shown as frequency response 220 in FIG. 4 and compared with the frequency response 210, which is also shown FIG. 2. The response 220 is similar to response 210 at low frequencies, but has higher gain in the mid-frequency range, and a higher bandwidth. For disk drives in general and for the frequency responses described herein, the low frequency range is generally meant to be below approximately 300 Hz, the mid frequency range is generally meant to be approximately 300 Hz to 2 kHz, and the high frequency range is generally meant to be above approximately 2 kHz. However, the boundaries between what are considered low, mid, and high frequency ranges are more accurately linked to where the microactuator begins to dominate the overall frequency response and the open loop bandwidth (0 dB crossover) achievable with a single-stage actuator. This is strongly related to the physical size of the disk drive.

The Invention

In a dual-stage actuator disk drive as described above, failure of the secondary actuator will result in reduced performance and may lead to loss of data and/or failure of the disk drive. Thus it is important to be able to detect actual failure of the secondary actuator and re-optimize the controller parameters if the failure is recoverable.

This invention is a dual-stage actuator disk drive that uses a secondary-actuator failure-detection test run by the servo control processor. The test can be performed on a regular schedule or at selected times, such as at disk drive start-up. The secondary actuator is removed from the control loop and the primary actuator maintains the read/write head on a data track in the track-following mode. The servo control processor then generates a test signal to the secondary actuator and receives the PES as the read head detects the PES bursts in the data track being followed. The servo control processor calculates the response of the secondary actuator to the test signal by deconvolving the motion of the primary actuator from the PES. The calculated response is then compared with an expected response to determine if the secondary actuator has failed. In the preferred embodiment the test comprises two measurements: a measurement of the secondary-actuator static characteristics, and a measurement of the secondary-actuator dynamic characteristics. Either test alone can be used to determine secondary-actuator failure, but the dynamic characteristics test can also be used to modify the controller parameters in the event that the secondary actuator has not failed but minor changes in the secondary-actuator dynamic characteristics have occurred.

The static characteristics measurement is a calculation of the secondary-actuator "stroke", i.e., the amount of secondary-actuator movement as a function of voltage input to the secondary actuator, and a comparison of the calculated stroke to a predetermined range of acceptable stroke values. In one method, while the primary actuator maintains the read/write head on a data track, a static test signal, e.g., a fixed bias voltage, is applied to the secondary actuator. The servo control processor receives the PES response to this static test signal and generates a control signal to the primary actuator to move the read/write head back on track. The change on the primary actuator control signal can be used to calculate the stroke of the secondary actuator. In another method, if the secondary actuator includes a relative-position sensor then the relative-position signal (RPS) response to this static test signal can be used to calculate the stroke of the secondary actuator. The calculated stroke values are averaged over several disk rotations. If the calculated stroke is outside the acceptable range, then this is an indicator that the secondary actuator has likely failed.

If the calculated stroke is within the acceptable range, then the dynamic characteristics measurement is made. This measurement is essentially a calculation of the plant frequency response of the secondary actuator. With the primary actuator maintaining the read/write head in track-following mode, a dynamic test signal is applied to the secondary actuator and the servo control processor calculates the response of the secondary actuator to the dynamic test signal by deconvolving the motion of the primary actuator from the PES. The test signal for the dynamic characteristics measurement is a series of dynamic test signals, each a sinusoidal signal at a constant frequency. The PES is detected during the application of the constant-frequency test signal. A deconvolution routine is run that removes the motion of the primary actuator from the PES, resulting in the response of the secondary actuator. The resulting gain and phase of the response are recorded along with the corresponding frequency. This is repeated for each frequency in the series of dynamic test signals. This enables the plant frequency response of the secondary actuator to be measured. If the response is significantly different from the expected response, it is virtually assured that the secondary actuator has failed. If the measured frequency response shows minor changes, such as a minor increase or decrease in the gain, or a minor shift in the frequency at which the maximum gain occurs, the controller parameters are adjusted or re-optimized. This re-optimization changes the values of the controller parameters in the memory accessible by the servo control processor. The parameters that can be changed include parameters that affect bandwidth or stability margins, notching of particular frequencies such as the secondary-actuator resonant frequency, active damping of the secondary-actuator resonance, or other performance, robustness, or stability metrics.

While the invention is fully applicable to a dual-stage actuator disk drive with a servo control system having a conventional dual-stage controller as described above, the invention will be described in detail below as implemented in the dual-stage actuator disk drive with the improved servo control system of the previously-cited co-pending application Ser. No. 10/802,601.

Figure 5:
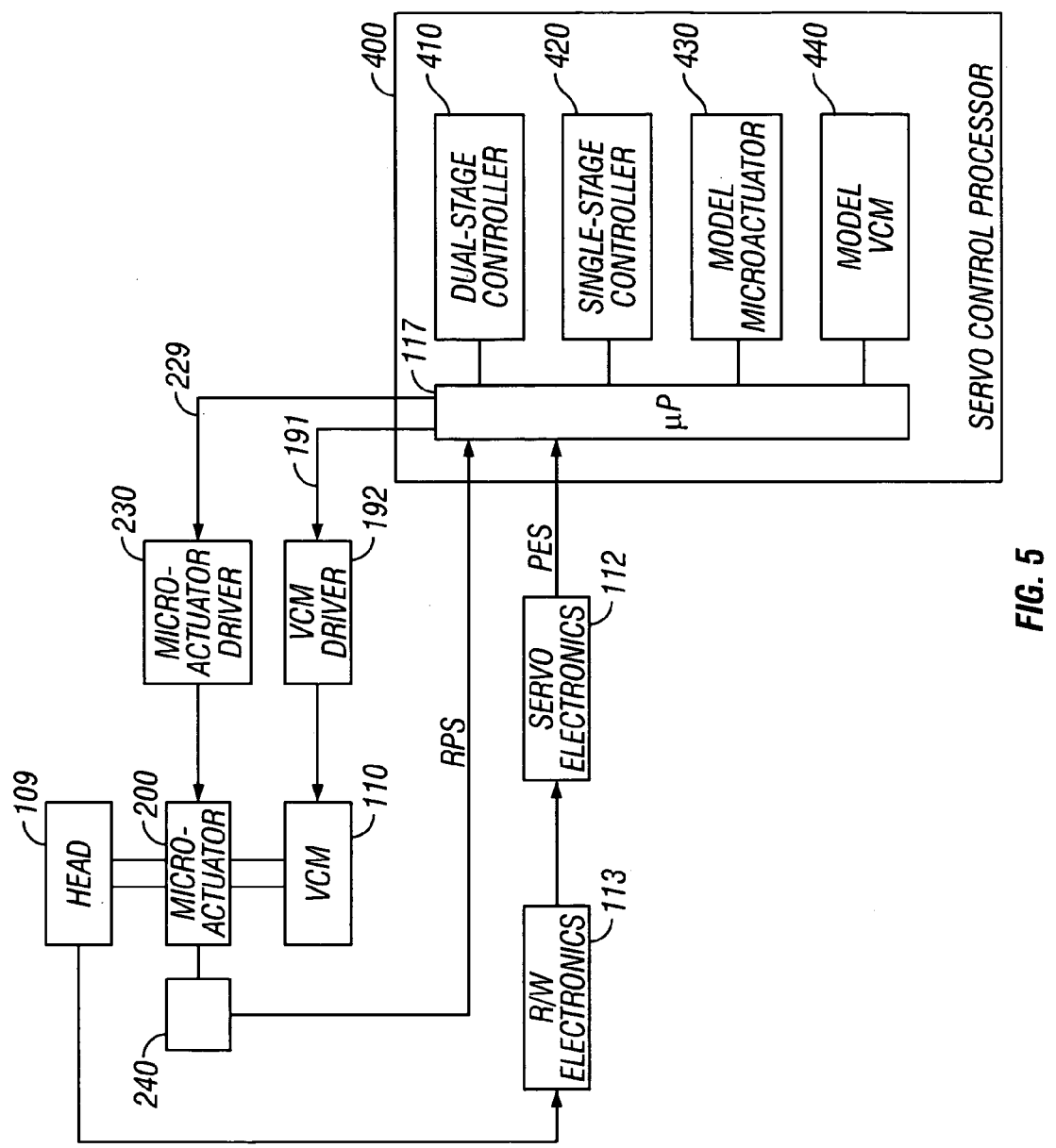
FIG. 5 is a block diagram of a disk drive with a dual-stage actuator and control system according to this invention.

FIG. 5 is a block diagram of the control system of the present invention for a dual-stage hard disk drive. The head 109 reads the servo pattern from the disk, the read/write electronics 113 processes the signal from the head 109, and the servo electronics 112 generates the PES from the signals from read/write electronics 113, all as described in the prior art.

The servo control processor 400 receives the PES from servo electronics 112, and provides a primary control signal 191 to VCM driver 192 and a secondary control signal 229 to microactuator driver 230. The servo control processor includes a microprocessor 117 and uses a dual-stage controller 410 to generate control signals 191, 229. The dual-stage controller 410 incorporates a degraded-stability VCM controller with relatively high low-frequency open-loop gain, and a secondary-actuator controller providing stability to the dual-stage controller and high mid-to-high-frequency open-loop gain, resulting in increased bandwidth. However, if the microactuator 200 fails while the disk drive is under the control of dual-stage controller 410, then VCM 110 will become unstable. If the microactuator 200 fails then the servo control processor 400 switches to use of a single-stage stable controller 420 and generates only a primary control signal 191 to VCM driver 192. The single-stage controller 420 can be a VCM controller based on the frequency response 210 (FIG. 2) or any VCM controller that is stable without the microactuator 200. This stable VCM controller 420 will most likely have decreased performance, but will prevent catastrophic failure of the disk drive that would result in loss of data.

As shown in FIG. 5, the microactuator 200 may include a relative-position sensor 240 that may be used to detect potential failure of the microactuator and to measure the response to the static test signal. The sensor 240 measures the displacement of microactuator 200 relative to its neutral position (and thus to VCM 110) and provides a relative-position signal (RPS) to servo control processor 400.

Figure 6:
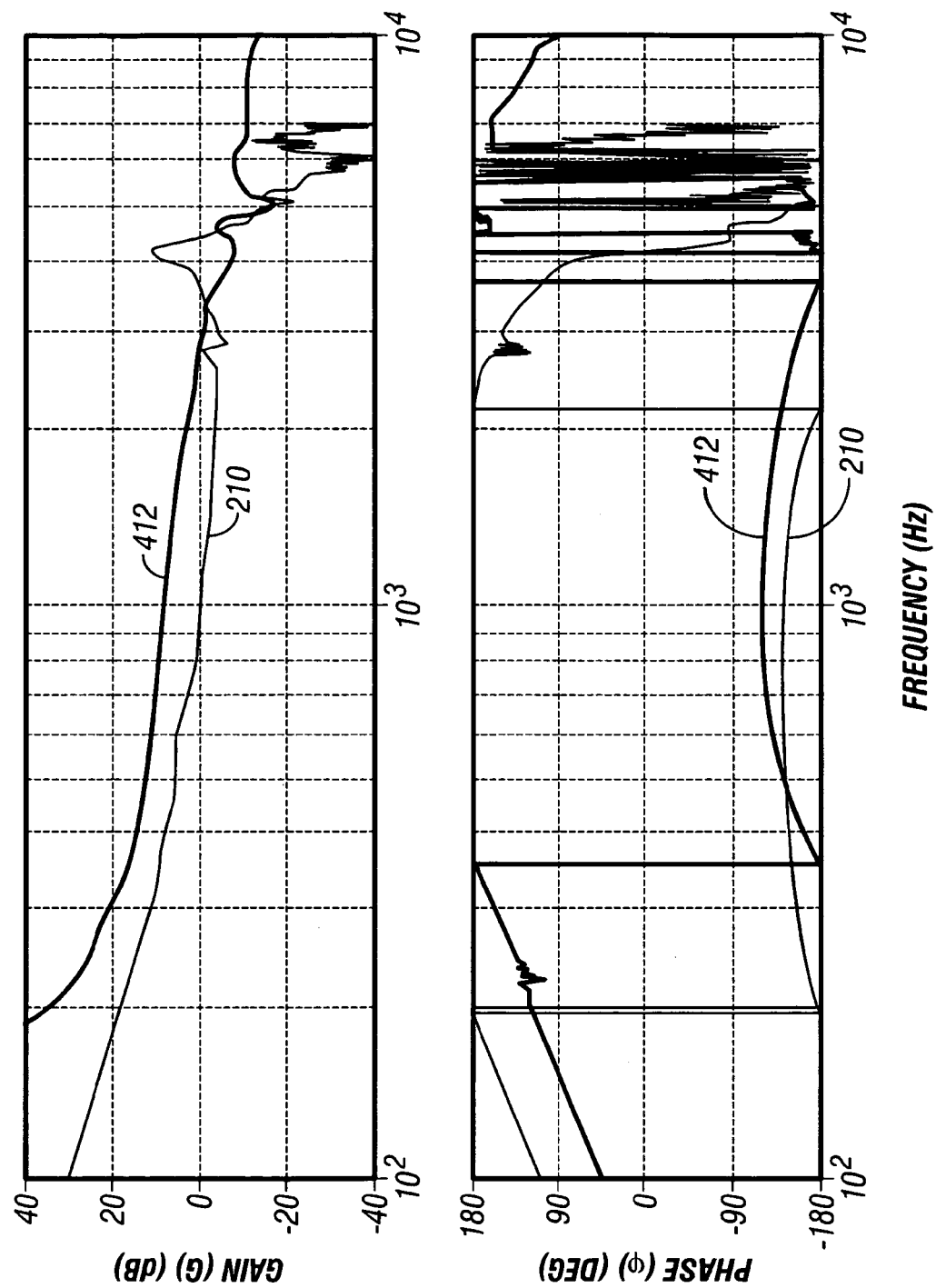
FIG. 6 is a comparison of the open-loop frequency response for the dual-stage controller with a degraded-stability VCM controller design according to this invention and the open-loop frequency response of FIG. 2.

FIG. 6 is the open-loop frequency response 412 for the dual-stage controller 410 with a degraded-stability VCM controller design compared with the frequency response 210 for the single-stage stable controller 420. As frequency response 412 shows, the low frequency gain may be increased by relaxing the stability requirements of the VCM, but at the expense of robustness. The resulting open-loop frequency response of the dual-stage system 412 has increased gain over a wider frequency compared to the open-loop frequency response of the dual-stage system 220 shown in FIG. 4. This will result in better disturbance rejection and performance. The frequency response of the dual-stage system 412 has gain and phase margins that are comparable to the frequency response of the single-stage system 210 in FIG. 2. The phase margin near 2.8 kHz is about 30 degrees and the gain margin near 3.8 kHz is about 5 dB.

Figure 7:
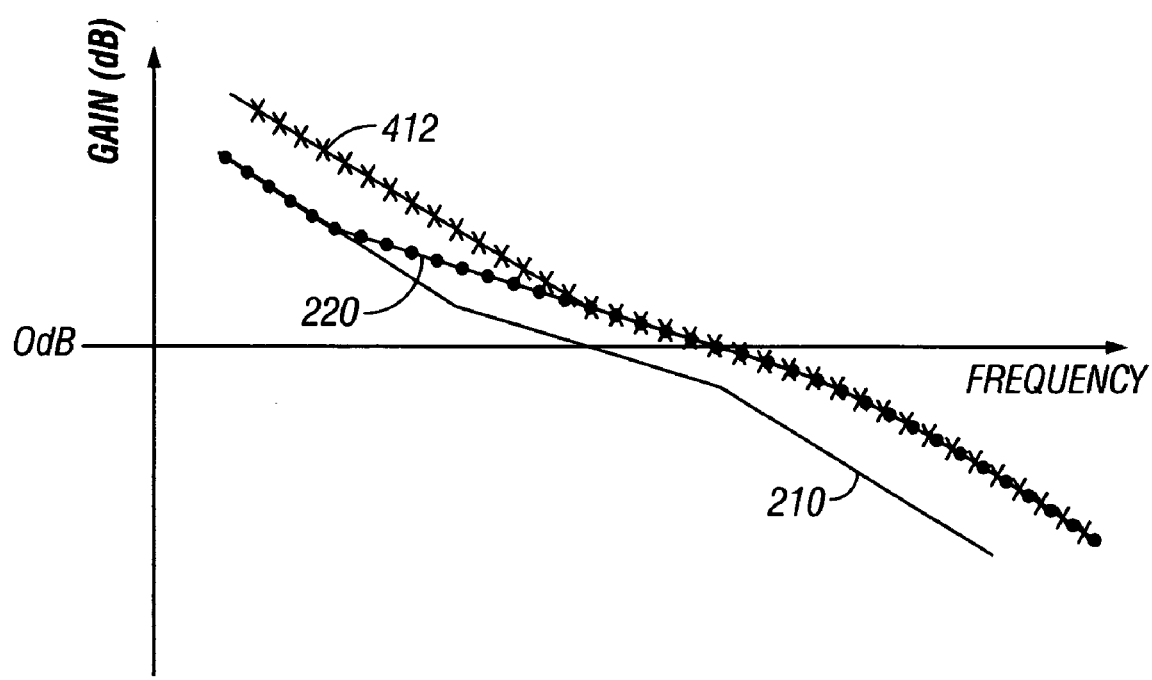
FIG. 7 shows the gain of the VCM open-loop frequency response for a stable single-stage VCM controller, the gain improvement with the addition of a secondary actuator, and the further gain improvement with the use of an increased-gain degraded-stability VCM controller and a secondary actuator.

FIG. 7 is the gain portion of three frequency responses. Solid line 210 represents the gain of the VCM open-loop frequency response for a stable single-stage VCM controller. Dotted line 220 represents the improvement to response 210 with the addition of the secondary actuator (microactuator 200) and is the typical shape for a conventional dual-stage controller. It has increased bandwidth and increased gain in the mid-frequency range. This will result in improved disturbance rejection and faster response at these frequencies. However, because the low-frequency gain is still determined by the single-stage VCM controller, there is no improvement at low frequency. Cross-hatched line 412 represents the further improvement with the use of an increased-gain degraded-stability VCM controller and the secondary actuator. This response also has increased low-frequency gain, and is comparable in shape to the response for the VCM-only design, but shifted higher in frequency. However, increasing the low-frequency gain will also decrease the phase margin for the VCM controller, potentially to the point of instability of the VCM. The secondary actuator controller is then designed to make the combined system stable, as well as increasing the mid-frequency to high-frequency gain. Using the secondary actuator to ensure the stability of the combined system typically takes significantly less stroke than using the secondary actuator to increase the low-frequency gain, and is therefore a more efficient use of the limited secondary actuator stroke to achieve high bandwidth with adequate disturbance rejection.

With the dual-stage controller having the characteristics represented by line 412 in FIG. 7, failure of the secondary actuator results in an unstable system. This could lead to inoperability of the hard disk drive, or even failure with loss of data. This is avoided by detecting a potential failure of the secondary actuator and switching to a stable VCM-only controller. The potential failure of the secondary actuator is detected either by providing a model of the dynamic response of the primary and secondary actuators and comparing the modeled head-position with the measured head-position, or, if the secondary actuator has a relative-position sensor, by measuring the position of the secondary actuator relative to the primary actuator with the relative-position sensor and comparing the relative position to a modeled position of the secondary actuator. In the present invention, after a potential failure of the secondary actuator has been detected and switching to the VCM-only controller has occurred, the secondary-actuator failure-detection and calibration test is run by the servo control processor.

Figure 8:
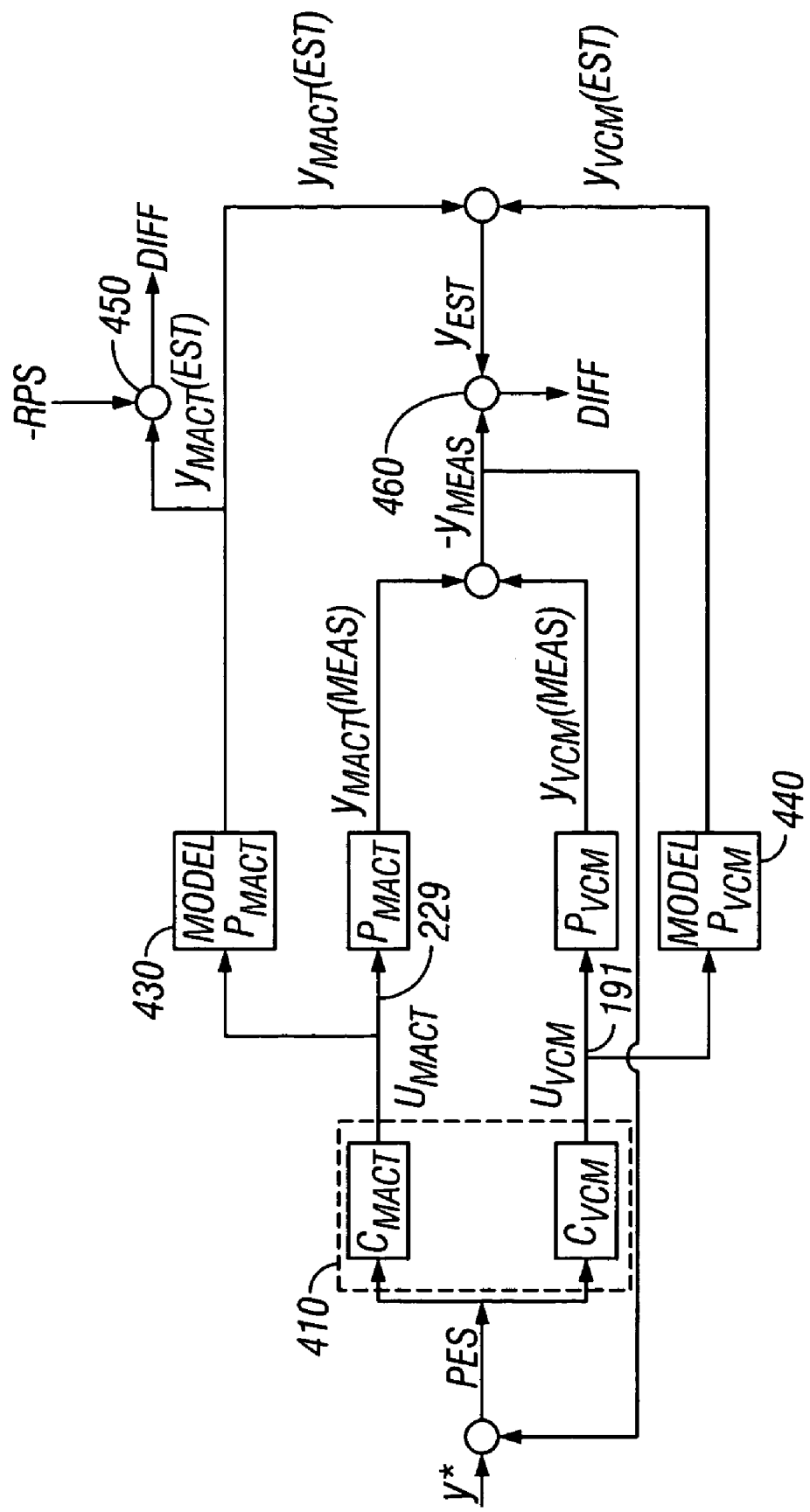
FIG. 8 is a schematic structure of the control system of this invention.

A schematic structure of the control system of the present invention is shown in FIG. 8. $C_{MACT}$ and $P_{MACT}$ represent the microactuator controller and plant, respectively, and $C_{VCM}$ and $P_{VCM}$ represent the VCM controller and plant, respectively. The controllers $C_{MACT}$ and $C_{VCM}$ together represent the dual-stage controller 410. The microprocessor 117 in servo control processor 400 (FIG. 5) runs the control algorithm using the parameters of controllers $C_{MACT}$ and $C_{VCM}$ and generates control signals $u_{MACT}$ and $u_{VCM}$ (229 and 191, respectively, in FIG. 5). The control system includes a model 430 of the microactuator plant and a model 440 of the VCM plant. These models may be determined from frequency response measurements of the microactuator and VCM, finite element models (FEM), or other well-known system identification techniques.

FIG. 8 shows two methods for determining potential failure of the microactuator 200. In the preferred method the calculated microactuator control signal $u_{MACT}$ is input to the microactuator model 430 and the estimated microactuator position $y_{MACT(EST)}$ from the model is compared to the RPS from sensor 240 at junction 450. In an alternative "PES-based" method the calculated microactuator control signal $u_{MACT}$ is input to the microactuator model 430 and the calculated VCM control signal $u_{VCM}$ is input to the VCM model 440. The modeled expected or estimated output $y_{EST}$ is then compared with the measured output $y_{MEAS}$ at junction 460.

Figure 9:
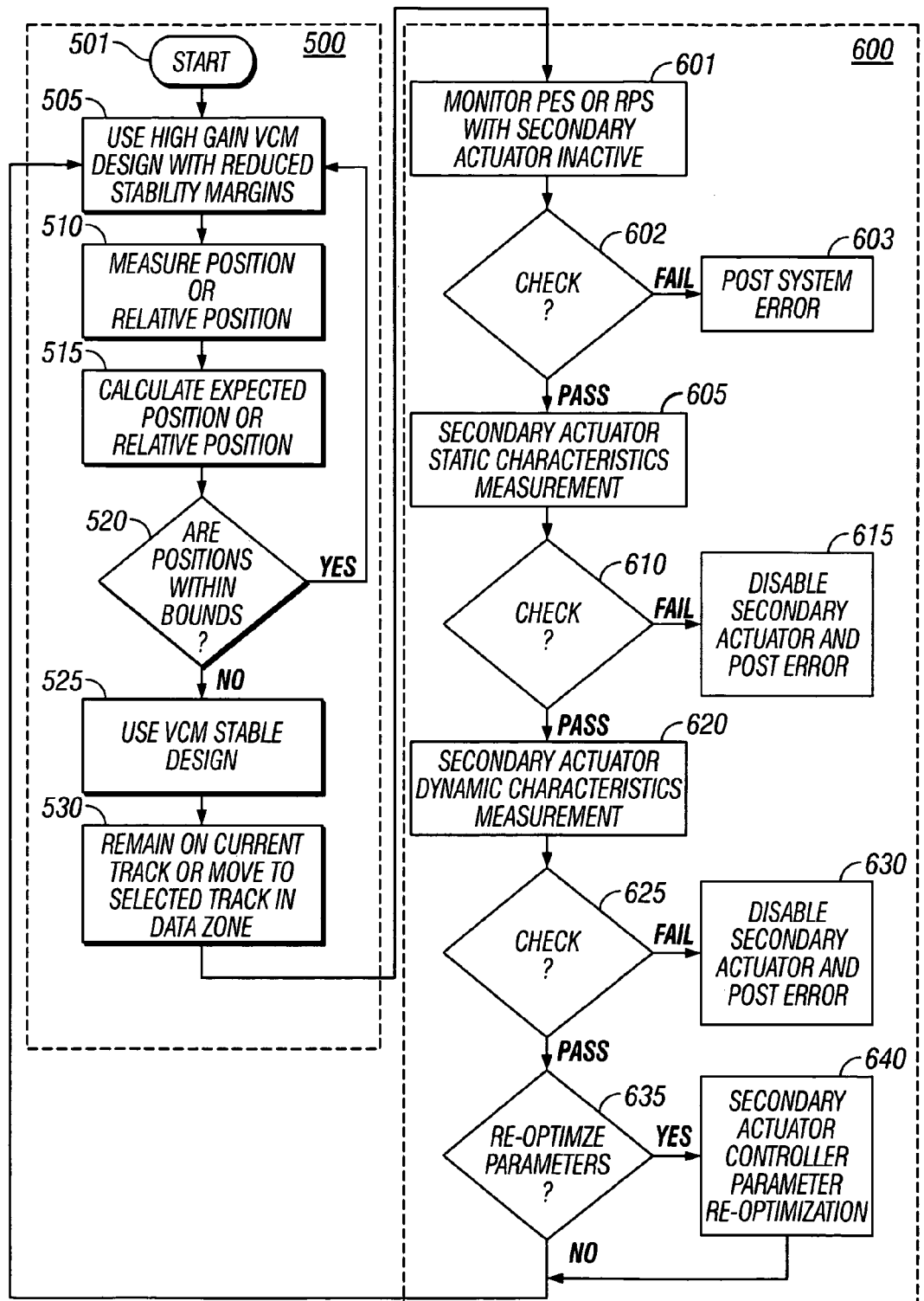
FIG. 9 is a flow chart for the operation of the disk drive of this invention.

FIG. 9 is a flow chart for the operation of the disk drive of the present invention. The flow chart portion 500 describes the method for detecting potential failure of the secondary actuator and switching to the VCM-only stable controller if potential failure is detected, and flow chart portion 600 describes the method for detecting actual failure of the secondary actuator and possible re-optimization of the controller parameters to enable switching back to the dual-stage controller having a degraded-stability VCM controller.

Referring first to portion 500, the control system starts (block 501) and continues to operate using the dual-stage controller 410 with the degraded-stability VCM controller (block 505). In block 510, the position of the head is measured ($y_{MEAS}$) if the PES-based method is used, or the relative position of microactuator 200 is measured (RPS) if the relative position sensing method is used. In block 515 the expected or estimated head position $y_{EST}$ is calculated from the models 430, 440 if the PES-based method is used, and the expected or estimated relative position ($y_{MACT(EST)}$) is calculated from microactuator model 430 if the relative position sensing method is used. The difference (DIFF) is then tested to see if it is within pre-determined bounds (block 520). If yes, the control continues (block 505).

If DIFF is outside the bounds, this indicates potential failure of the microactuator 200. Once a potential failure of the secondary actuator has been detected the servo control processor 400 recalls the stable VCM controller 420 (FIG. 5) from memory (block 525). This removes the secondary actuator from the control loop. The VCM controller 420 sends control signals to the VCM 110 to maintain the head on the data track in the track-following mode, or alternatively to move the head to another data track for track-following (block 530).

The operation then moves to the steps described in flow chart portion 600. First, it may be desirable to determine if the problem that caused the detection of potential secondary-actuator failure persists with the single-stage VCM controller 420 operating and the secondary actuator inactive. This information can be used to help determine whether the error is caused by something other than a failure of the secondary actuator. Thus, as an optional procedure the PES can be monitored (block 601). This can be done by measuring the statistics of the PES, such as the standard deviation, and comparing them to an acceptable value (block 602). If the PES measurements are outside the range of acceptable values, this is an indication that the error is due to something other than a failure of the secondary actuator, and a system error is posted (block 603). If the secondary actuator has a relative-position sensor the RPS can also be monitored (block 601). If the RPS measurements are large, i.e., substantially greater than zero, while the secondary actuator is inactive, this is an indication that the error is likely due to the secondary actuator system, and the process can pass to the static characteristics measurement (block 605), or alternatively directly to the dynamic characteristic measurement (block 620) without the need for a static characteristics measurement, or alternatively disable the secondary actuator and post an error (block 615) without further testing of the static or dynamic characteristics measurements.

If the PES measurements are within the range of acceptable values at the comparison check (block 602), then this indicates that there is a problem with the secondary actuator and the secondary-actuator static characteristics measurement is performed (block 605). With the head maintained in track-following mode, a static test signal is applied to the microactuator 200 to calculate its stroke. At the check point (block 610) if the stroke is two low or too high, as compared to predetermined acceptable stroke values, then the secondary actuator has failed. The secondary actuator is disabled by selecting the VCM-only controller 420 and an error is posted to the disk drive system (block 615). If the calculated stroke meets the acceptable criteria, then the secondary-actuator dynamic characteristics measurement is started (block 620).

The secondary-actuator dynamic characteristics measurement measures the secondary-actuator plant frequency response. At the check point (block 625) if the measured response is significantly different from the expected result, then the secondary actuator is disabled by selecting the single-stage VCM controller 420 and an error is posted to the disk drive system (block 630). If the measured response shows only minor changes, such as a minor gain increase or decrease, or a minor shift in the peak frequency, then the secondary actuator can be recovered from potential failure (block 635). The controller parameters are then adjusted or re-optimized (block 640). The dual-stage controller 410 with the degraded-stability VCM controller and the new secondary-actuator controller parameters is re-selected (block 505) and operation continues. As an additional feature, a counter counts the number of times the controller parameters are re-optimized, which indicates the number of times a failure of the secondary actuator has been detected but both the static and dynamic characteristics measurements have been successful. If this count exceeds a certain threshold within a certain time period, indicating that failures are becoming too frequent, then subsequent modification of the controller parameters is terminated, an error is posted and the secondary actuator is disabled (block 630).

Figure 10A:
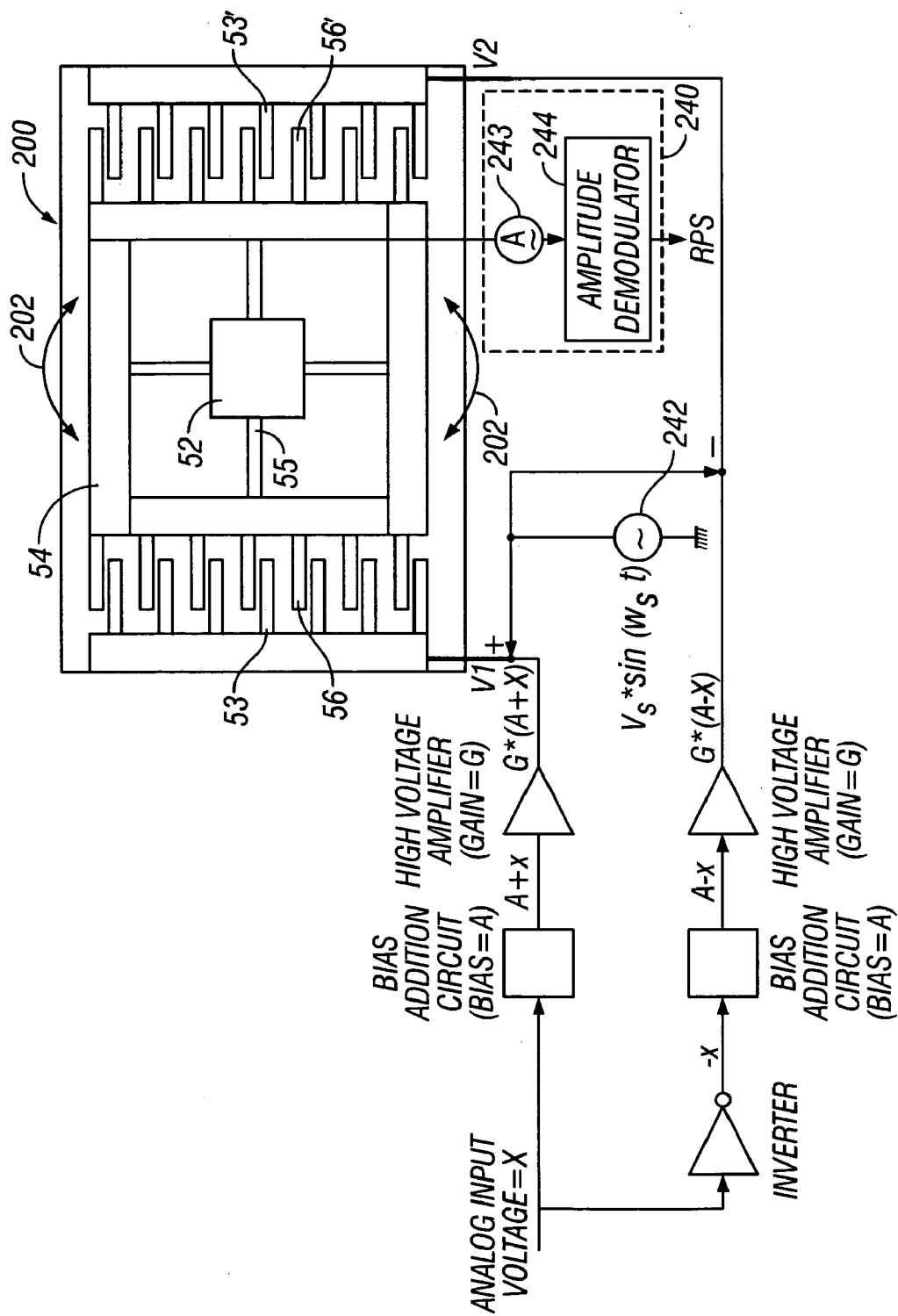
FIG. 10A is a schematic of rotary electrostatic microactuator, its associated driving circuitry, and the relative-position sensor that provides a relative-position signal (RPS) that can be used in the present invention.

As previously described, the secondary actuator may include a relative-position sensor that generates an RPS. The RPS can be used as an alternative to the PES to determine if the problem that caused the detection of potential secondary actuator failure persists (block 601) and as the measurement of secondary-actuator response to the static test signal (block 605). FIG. 10A is a schematic showing an example of a relative-position sensor 240 for the rotary electrostatic microactuator 200 previously depicted in FIG. 3A. Because the output force of an electrostatic microactuator is proportional to the square of the voltage difference between the stationary and movable electrodes (53 and 56; 53' and 56'), it is desirable to linearize the voltage-vs.-force relationship. FIG. 10A shows the common differential driving method. In this method, an analog control voltage x is the input to the system. This voltage is processed in two ways, and applied to the two input terminals of the microactuator. In one path, a fixed bias voltage of A is added, followed by fixed gain amplification G by a high voltage amplifier, resulting in a voltage G*(A+x), which is connected to the microactuator's V1 terminal for the stationary electrodes 53. In another path, the analog input signal x is inverted, and the same fixed bias voltage A is added, and amplified by the same fixed gain G, resulting in a voltage G*(A−x), which is connected to the microactuator's V2 terminal for the stationary electrodes 53'. Since the voltage V1 generates counter-clockwise torque and the voltage V2 generates clockwise torque, the net torque will be the difference of these two torques, which is proportional to $$(G*(A+x))^2 - (G*(A-x))^2 = 4G^2 Ax.$$

The result is that the torque is linear to the input control voltage x.

The relative-position of the microactuator 200, i.e. the position of rotatable frame 54 relative to its neutral position, can be determined by modeling the electrostatic microactuator as two variable capacitors. The capacitance between electrodes 53 and 56 is equal to the capacitance between electrodes 53' and 56' when the frame 54 is at its neutral position. When the frame 54 moves from its neutral position, one of the capacitances increases and the other capacitance decreases. A sensing signal $V_s*\sin(w_s*t)$ is added to one side of the drive signal $G*(A+x)$ and subtracted from the other side of the drive signal $G*(A-x)$, as represented schematically by an oscillator 242 connected to the two drive signal input lines to respective terminals V1, V2. The oscillator 242 generates this fixed, small amplitude, high frequency (e.g., +/−1V, 2 MHz) sensing signal, which is applied to the two capacitors of the microactuator. When there is any imbalance between the two capacitors, meaning that the microactuator has moved away from the neutral position, a current with a frequency the same as the sensing signal frequency will appear at the middle point of the two capacitances to ground (shown schematically as AC current meter 243). The amplitude of the signal at this particular frequency is proportional to the capacitance imbalance, which is again proportional to the position of the microactuator. The amplitude of the current signal at the frequency of the added sensing signal frequency is detected by amplitude demodulator 244 and the output is the relative-position signal (RPS). The amplitude is zero when the two capacitances are equal. The use of a capacitance sensing circuit as a relative-position sensor for an electrostatic microactuator is described in detail by M. T. White and T. Hirano, "Use of the Relative-position signal for Microactuators in Hard Disk Drives", *Proceedings of the American Control Conference*, Denver, Colo., Jun. 4–6, 2003, pp. 2535–2540.

The above-described method for relative-position sensing of an electrostatic secondary actuator uses the force-generating elements for position sensing, i.e., the sets of stationary and fixed electrodes. If the secondary actuator is a piezoelectric actuator, the force-generating piezoelectric material, such as lead zirconium titanate (PZT), can be used for position sensing by monitoring the charge. In addition, relative position of a secondary actuator can be sensed by integration of standard displacement using known sensors, such as potentiometers, strain gauges, encoders, capacitance probes, and piezoelectric material.

In the present invention the secondary-actuator failure detection and calibration test comprises two measurements: a measurement of the secondary-actuator static characteristics and a measurement of the secondary-actuator dynamic characteristics. The static characteristics measurement checks the secondary-actuator movement amount per some constant first or static test signal, and the dynamic characteristics measurement checks the plant frequency response of the secondary-actuator movement against a second or dynamic test signal at one or more frequencies.

1) Secondary-actuator Static Characteristics Measurement

Figure 11:
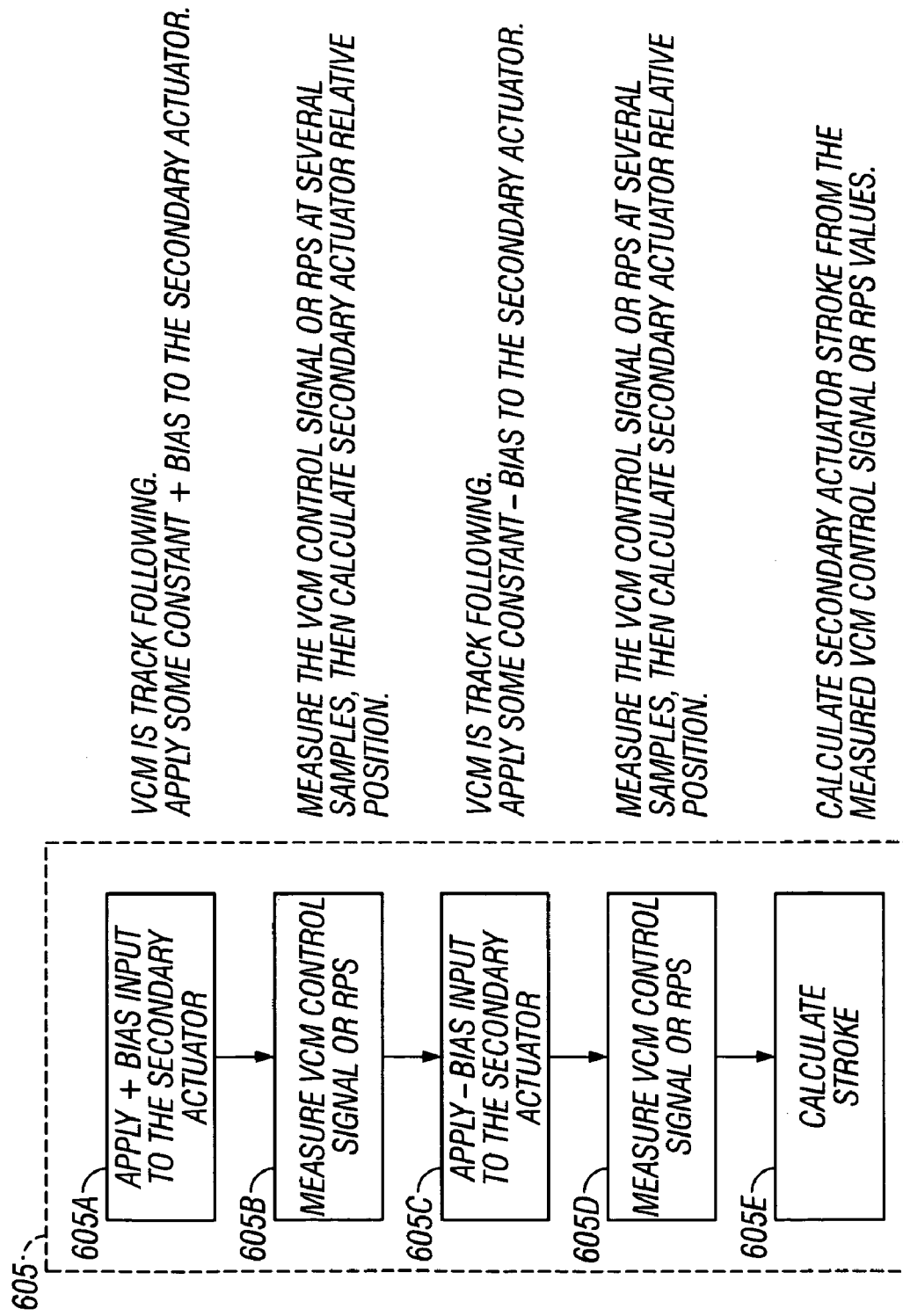
FIG. 11 is a flow chart of the details of the secondary-actuator static characteristics measurement in this invention.

FIG. 11 is a flow chart showing the details of the secondary-actuator static characteristics measurement (block 605 in FIG. 9). Because the single-stage or VCM controller 420 has been selected (block 525 in FIG. 9), the secondary actuator is not part of the control loop and its input is initially set as a neutral bias. A constant input voltage is then applied as a positive bias to the secondary actuator (block 605A) and either the VCM control signal is measured or the RPS is measured (block 605B).

Figure 10B:
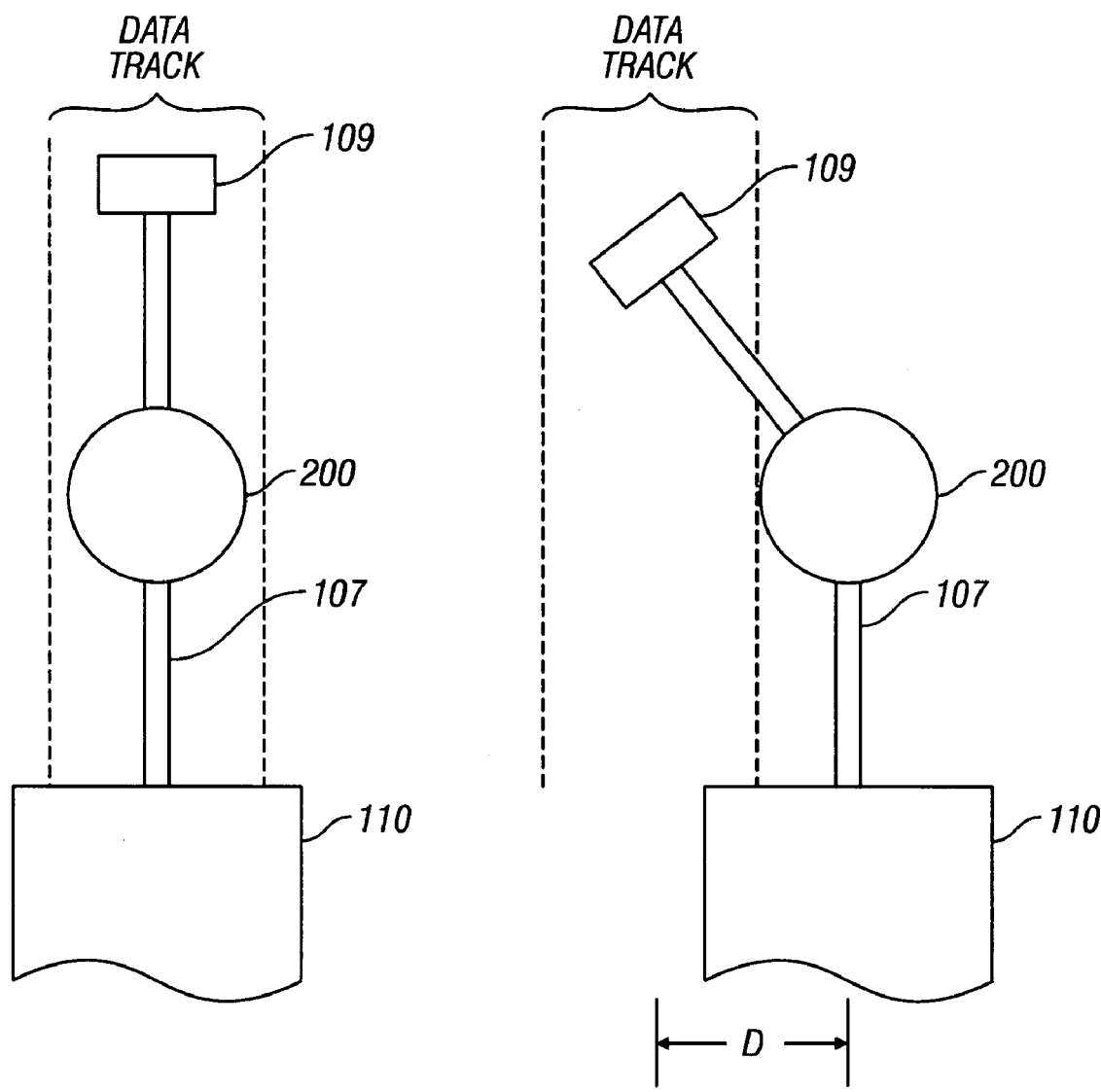
FIG. 10B is a schematic showing the head in track-following mode before and after application of a bias voltage as part of the secondary-actuator static characteristics test of the present invention.

The secondary-actuator static characteristics measurement is illustrated schematically in FIG. 10B. The suspension 107 attached to the primary actuator (VCM 110 in FIG. 5) supports the secondary actuator (microactuator 200) which supports the read/write head 109. As shown in the left portion of FIG. 10B, the head 109 is following the data track since the VCM-only controller (420 in FIG. 5) is in track-following mode. When the positive bias voltage (block 605A in FIG. 9) is applied to microactuator 200, the head 109 will move a fixed amount, but will be maintained in track-following mode because the head provides the PES to the VCM-only controller 420. If the microactuator includes a relative-position sensor (240 in FIG. 5), then the RPS can be directly correlated with the bias voltage to calculate the stroke. If the microactuator does not have a relative-position sensor, then the amount of microactuator movement can be determined form the control signal (191 in FIG. 5) output by VCM-only controller 420. This control signal is the signal required to maintain the VCM (and attached suspension 107) in the position shifted by displacement D, as shown in the right portion of FIG. 10B, so that the head 109 is maintained in track-following mode. Because the characteristics of the VCM are known the difference in the VCM control signal before and after application of the bias voltage is a measure of the amount of head movement. Thus the head movement can be directly correlated with the applied bias voltage to calculate the stroke.

Next a constant input voltage is applied as a negative bias to the secondary actuator (block 605C) and either the VCM control signal is measured or the RPS is measured (block 605D) in the same manner as just described. The measurements (blocks 605B and 605D) are done multiple times and the average is calculated to get an accurate measurement. The secondary-actuator stroke is then calculated (block 605E) as the measured movement of secondary actuator for the known positive and negative voltage inputs. The calculated stroke is then compared with acceptable stroke values at check point 610 (FIG. 9).

2) Secondary-actuator Dynamic Characteristics Measurement

Figure 12:
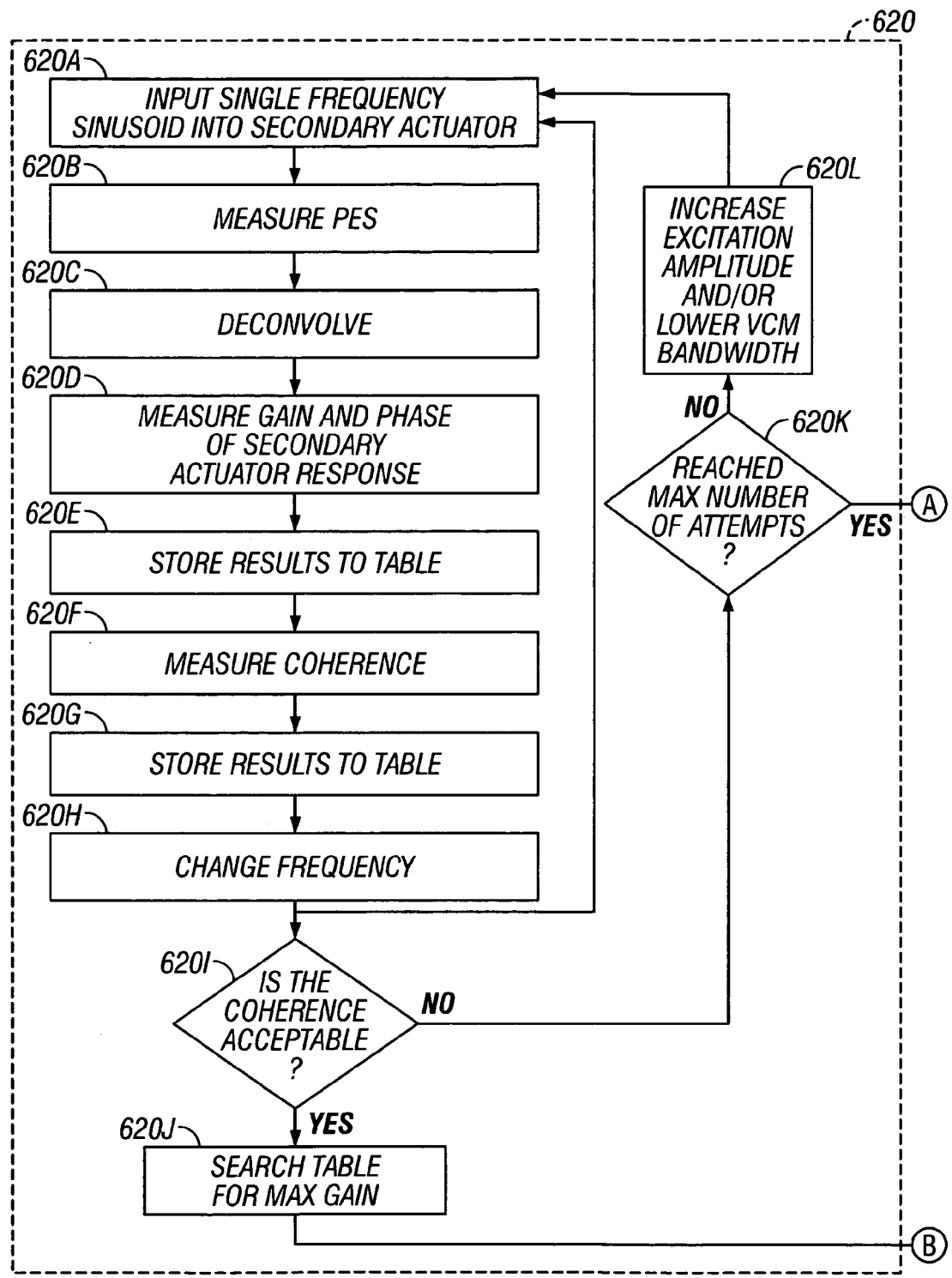
FIG. 12 is a flow chart of the details of the secondary-actuator dynamic characteristics measurement in this invention.
Figure 12:
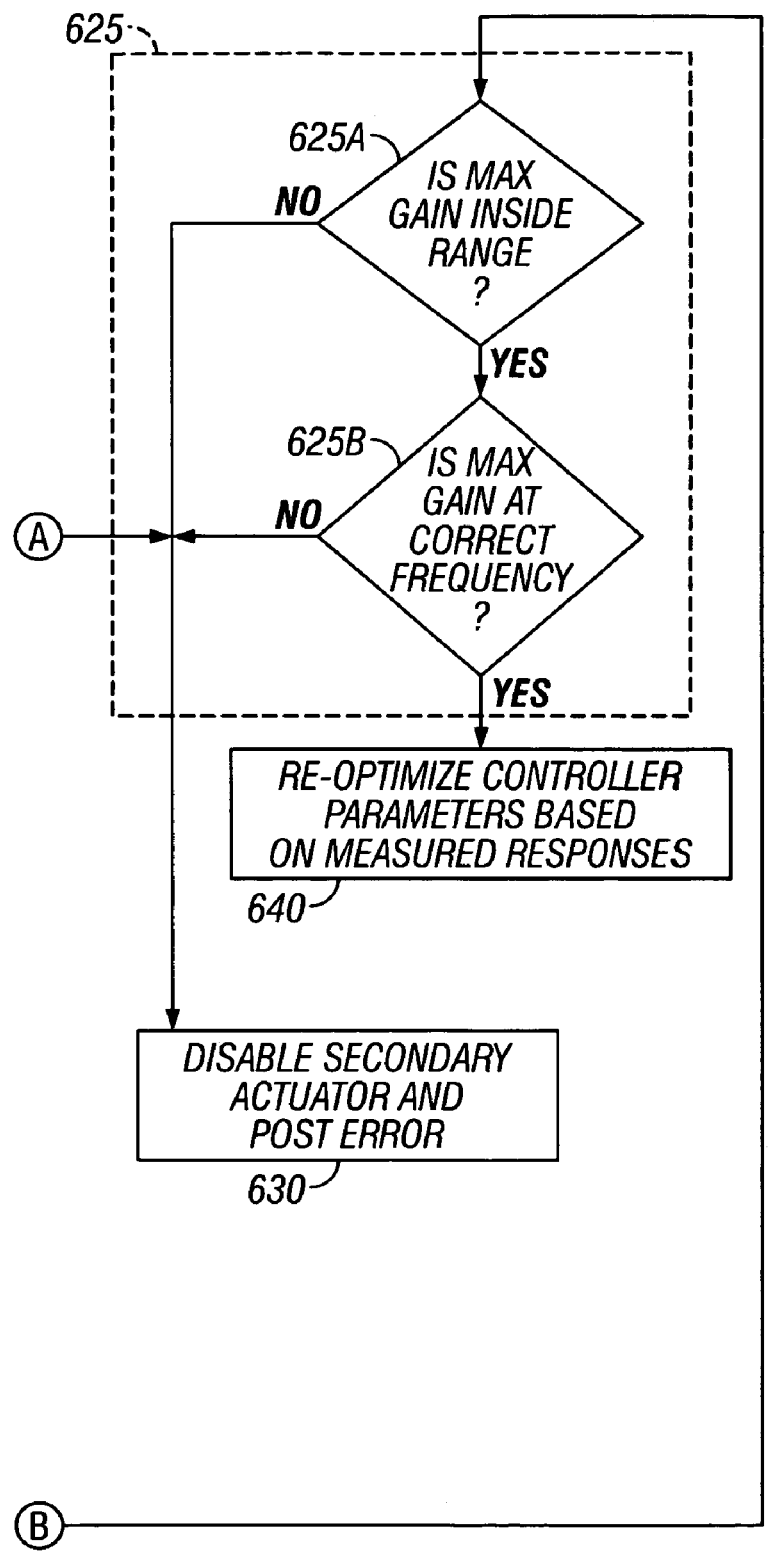

FIG. 12 is a flow chart showing the details of the secondary-actuator dynamic characteristics measurement (block 620 in FIG. 9). This measurement is performed after the static characteristics measurement and with the VCM-only controller maintaining the head in track-following mode on a data track. With the secondary actuator removed from the control loop, the secondary-actuator input is initially set as a neutral bias. Next the first frequency of the secondary-actuator dynamic test signal is selected and a sinusoidal input is made to the secondary actuator at the first frequency (block 620A). Generally the amplitude of the sinusoidal input signal is held constant during the entire measurement. Then the PES response to the dynamic test signal is detected for several samples (block 620B).

The desired frequency response for determination of the secondary-actuator dynamic characteristics is the secondary-actuator plant frequency response, or equivalently, the secondary-actuator open loop frequency response since the secondary-actuator controller is known. However, because the secondary actuator is attached to the VCM primary actuator, the position response to the dynamic test signal is the result of the frequency response of the secondary-actuator plant convolved with the VCM sensitivity function.

Figure 13:
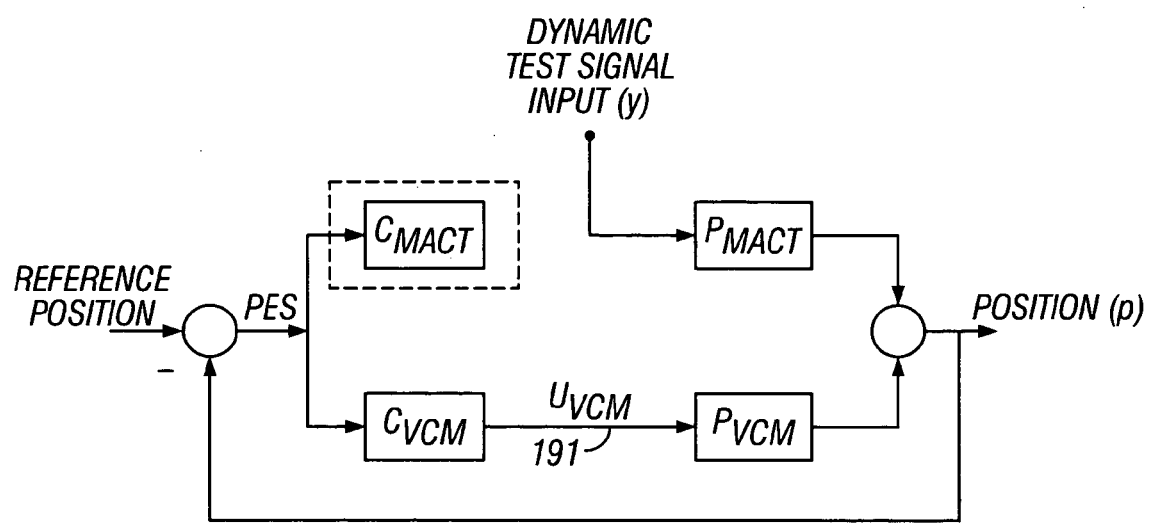
FIG. 13 is a schematic structure of the control system of the present invention for illustrating deconvolution of the secondary-actuator response from the PES response to the secondary-actuator dynamic characteristics test signal.

Thus the secondary-actuator response to the dynamic test signal must be deconvolved from the measured position response (block 620C). The convolution in the time domain becomes a multiplication in the frequency domain. To solve for the secondary-actuator plant frequency response, the measured (complex-valued) frequency response in block 620B is divided by the measured (complex-valued) frequency response of the VCM sensitivity function. The VCM frequency response can be measured during the manufacturing process and stored to disk, measured as part of block 601 (FIG. 9), or measured as an additional step in block 620B. Deconvolution is the inverse of convolution and is a well-known process in digital signal processing. After the deconvolution the gain and phase of the microactuator response are calculated at 620D and the results stored in a table (block 620E) FIG. 13 is a schematic structure of the control system of the present invention for illustrating the deconvolution. $C_{MACT}$ and $P_{MACT}$ represent the microactuator controller and plant, respectively, and $C_{VCM}$ and $P_{VCM}$ represent the VCM controller and plant, respectively. However, since the VCM-only controller is operating during the application of the secondary-actuator dynamic characteristics measurement, $C_{MACT}$ is shown as inoperative, and the only control signal input is $u_{VCM}$. What is desired to be measured from the dynamic test signal input is $P_{MACT}$. If y is the input signal and p is the position signal, the following applies:

$$p/y = P_{MACT} * [1/(1+P_{VCM}*C_{VCM})],$$

where $1/(1+P_{VCM}*C_{VCM})$ is the known sensitivity function of the VCM.

Figure 14:
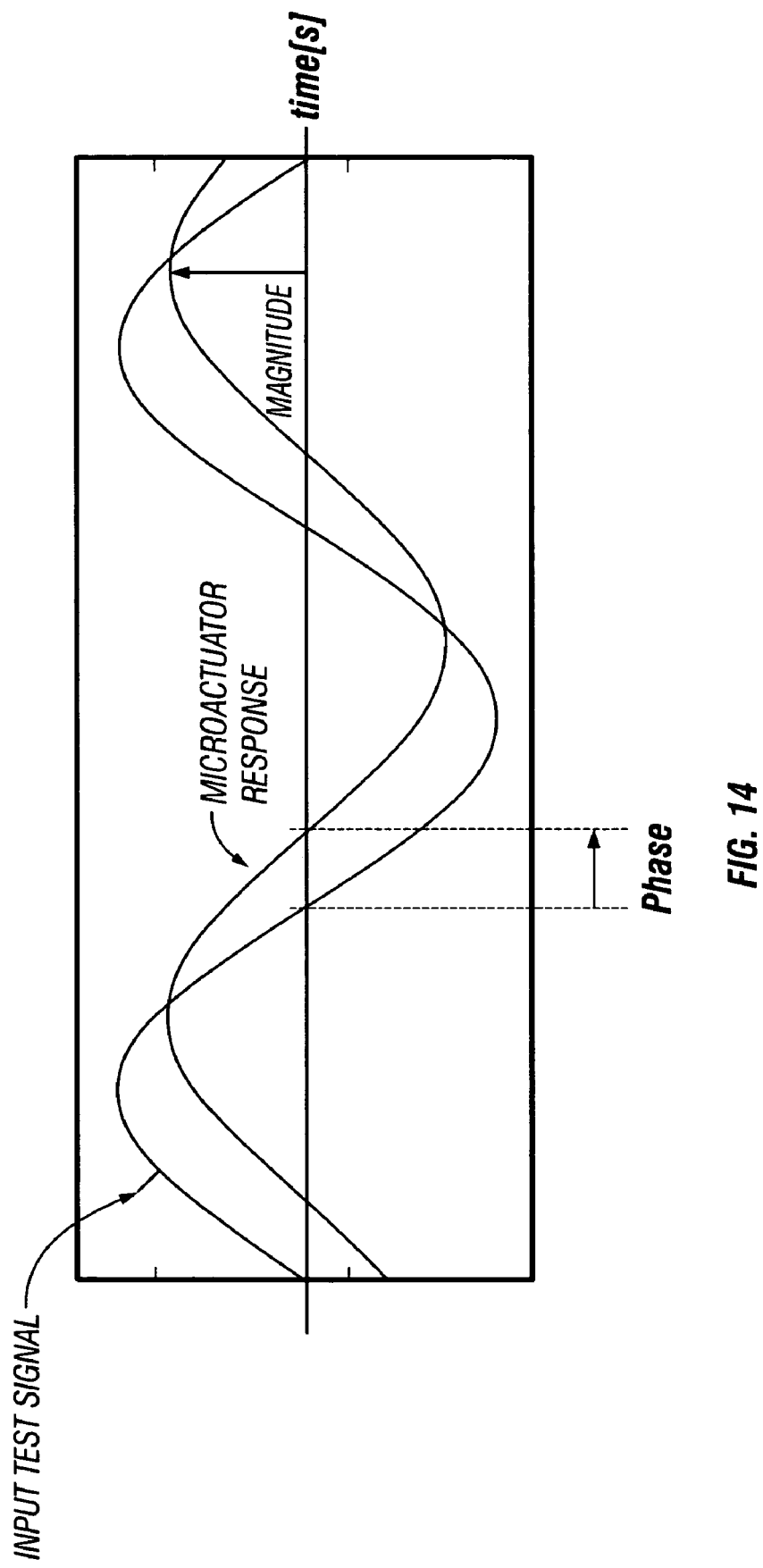
FIG. 14 shows a typical test signal at a fixed frequency and a RPS response for the measurement of the secondary-actuator dynamic characteristics.

FIG. 14 shows a typical dynamic test signal at a fixed frequency and a typical microactuator response as calculated from the deconvolution. (No units are listed on the vertical axis because FIG. 14 is intended to merely show the representative shapes for a test signal and the microactuator response.) The magnitude of the microactuator response is shown as the peak values, and the phase can be roughly calculated as the difference between the zero crossings of the test signal and the microactuator response. However, for a more accurate calculation of the gain and phase at the test signal frequency, a discrete Fourier transform (DFT) is applied to the microactuator values at the input test signal frequency to calculate the gain and phase (block 620D). Then the gain and phase for that input test frequency are stored in a table (block 620E).

In the method shown in FIG. 12, the deconvolution (block 620C) is performed for each input frequency before incrementing to the next input frequency. Alternatively, the deconvolution may be performed for each frequency after all of the input frequencies have been tested. The same is true for the calculation of the coherence, to be described below.

In block 620F, as an optional part of the inventive method the coherence can be calculated. The coherence function $\gamma^2$ is a measure of the statistical validity of the frequency response measurement. It indicates the linear dependence of the output signal (the secondary-actuator response deconvolved from the measured PES) to the input signal (the dynamic test signal) as a function of frequency. It has values between 0 and 1, where 0 indicates no coherence and 1 indicates perfect coherence. Poor coherence is typically the result of noise on the measured signals, or potentially nonlinearities in the system. The coherence function is a calculation well-known in digital signal processing and is given by $$\gamma^2 = \frac{|G_{xy}|^2}{G_{xx}G_{yy}}$$

where $G_{xy}$ is the cross power spectrum of the input and output signals, $G_{xx}$ is the power spectrum of the input signal, and $G_{yy}$ is the power spectrum of the output signal. In block 620G the calculated coherence is stored in memory.

The next input frequency is then selected for the dynamic test signal (block 620H) and the process is returned to block 620A. The steps from blocks 620A to 620G are repeated until all desired frequencies in the series of dynamic test signals are tested. For the convenience of the DFT calculation, multiples of the disk rotational frequency may be selected.

After all desired frequencies have been tested, the calculated coherence is tested (block 620I). The average or a weighted average of the coherences previously calculated for each input frequency is tested against a predetermined value of acceptable coherence. The acceptable value, e.g., any value greater than 0.8, can be determined experimentally during manufacturing or design. If the coherence is not acceptable then a counter is incremented and at block 620K if the maximum count has not been reached the amplitude of the dynamic test signals is increased or, alternatively the VCM bandwidth is lowered by changing a single gain value (block 620L), and a new series of dynamic test signals is initiated at block 620A. If the coherence continues to be unacceptable (block 620I) and the maximum number of increased amplitudes or VCM bandwidth changes have occurred, the decision at block 620K is to disable the secondary actuator and post an error (block 630). If at any time the coherence is acceptable then the method moves to block 620J. The above description assumes that the amplitude of the dynamic test signals is started with a low value and that the VCM bandwidth is started with a high value. Alternatively, the amplitude of the dynamic test signal can be started with a high value and lowered and the VCM bandwidth can be started with a low value and raised, if the coherence is unacceptable.

At block 620J, after all desired frequencies have been tested and the coherence is acceptable, the table is searched for the maximum gain value and its corresponding frequency. After the maximum gain value has been obtained, the check point (block 625 in FIG. 9) is performed according to the details shown in FIG. 12. The maximum gain value is checked to determine if it is within an acceptable range of predetermined values (block 625A). For example, if the maximum gain is too low, e.g., not at least 20 db over the static gain, this is an indication of actual failure of the microactuator (block 630). There are potential microactuator failure modes in which the motion is excessive, in which case the maximum gain value may be too high. If the maximum gain is inside the range of acceptable gain values, then the measured frequency at which the maximum gain occurs is compared to a predetermined acceptable range (block 625B). For example, if the maximum gain occurs at more than 1 kHz from the known resonant frequency of the microactuator, this is an indication of actual failure of the microactuator (block 630). However, if the frequency at which the maximum gain occurs is within acceptable limits, then the controller parameters can be re-optimized (block 640). This re-optimization may take the form of a table lookup of pre-calculated parameters or may be performed in real-time through the use of an adaptive scheme. The controller may be adjusted to achieve such features as desired bandwidth or stability margins, notching of particular frequencies such as the microactuator resonance, designing for active damping of the microactuator resonance, or other performance, robustness, or stability metrics. However, if there is only a minimal or no substantial difference from the optimum values, then control can be returned to block 505 (FIG. 9) without re-optimizing the controller parameters.

Figure 15:
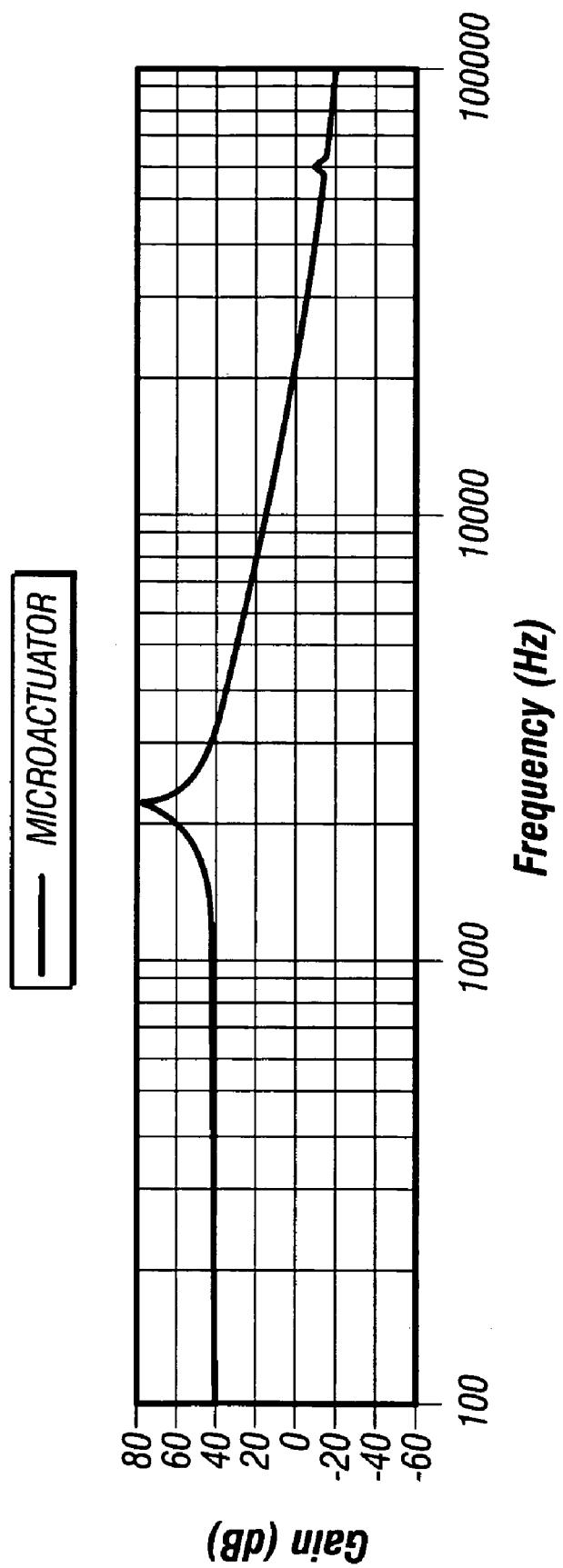
FIG. 15 is an example of the plant frequency response for a typical micro-electro-mechanical system (MEMS) type microactuator located between the suspension and the slider.

FIG. 15 shows one example of the plant frequency response for a typical micro-electro-mechanical system (MEMS) type microactuator located between the suspension and the slider. The motion of this type of microactuator is about 1 micrometer for a 30 V input at low frequency. So for the static characteristics test, a 0.5 micrometer movement would be expected for a 15 V input. If the measured output was less than about 0.2 micrometer or more than about 1 micrometer during the static characteristics measurement, then this would likely indicate failure of the microactuator. In a server class disk drive, the spindle motor frequency is between 167 Hz and 250 Hz, and the servo sector sampling frequency is currently 50 kHz or above. So for the dynamic characteristics measurement, an acceptable appropriate frequency range for the series of input test signals would be from about 200 Hz to 10 kHz. Thus as one example, the first sinusoidal test signal of FIG. 13 could be at 167 Hz with subsequent test signals increased in 167 Hz increments until the last test signal is reached at around 10 kHz. This type of microactuator also has a resonant frequency around 2 kHz, so if the maximum gain from the dynamic characteristics measurement is less than about 1 kHz or greater than about 3 kHz, then this would likely indicated failure of the microactuator.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for operating a dual-stage actuator disk drive, the disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a secondary actuator connected to the VCM, the head being connected to the secondary actuator; and (e) a servo control processor responsive to servo information read by the head and comprising (i) a dual-stage controller for simultaneously generating a VCM control signal and a secondary-actuator control signal, and (ii) a selectable single-stage controller for generating only a VCM control signal, the processor-implemented method comprising:

selecting the single-stage controller if a potential failure of the secondary actuator is detected;

generating from the single-stage controller a VCM control signal to cause the head to follow a data track;

generating a dynamic test signal to the secondary actuator;

receiving, in response to the dynamic test signal, a position error signal (PES) from the servo positioning information in the data track being followed;

calculating from the PES the response of the secondary actuator to the dynamic test signal; and posting a secondary-actuator failure signal if the calculated response is outside the range of the expected response.

2. The method of claim 1 wherein generating a dynamic test signal comprises generating a dynamic test signal having a fixed amplitude and fixed frequency, and wherein calculating the response of the secondary actuator from the PES comprises deconvolving the frequency response of the VCM from the PES to thereby calculate the frequency response of the secondary actuator.

3. The method of claim 2 further comprising calculating the coherence of the calculated frequency response of the secondary actuator, and wherein a secondary-actuator failure signal is posted if the coherence is less than a predetermined value.

4. The method of claim 2 further comprising:

generating a series of dynamic test signals, each of the dynamic test signals in the series being at a frequency different from the other dynamic test signals in the series;

calculating the response of the secondary actuator from the PES received for each dynamic test signal in the series; and recording the gains and corresponding frequencies from each of the calculated secondary-actuator responses; wherein a secondary-actuator failure signal is posted if the maximum recorded gain is outside a predetermined range.

5. The method of claim 4 further comprising:

calculating the coherence of the calculated frequency response of the secondary actuator for each dynamic test signal in the series;

calculating an average of the calculated coherences; and posting a secondary-actuator failure signal if the average is less than a predetermined value.

6. The method of claim 4 further comprising:

(a) calculating the coherence of the calculated frequency response of the secondary actuator for each dynamic test signal in the series;

(b) calculating an average of the calculated coherences;

(c) changing the amplitude of each of the dynamic test signals in the series if the average is less than a predetermined value;

(d) calculating the response of the secondary actuator from the PES received for each changed-amplitude dynamic test signal in the series;

(e) repeating (a) through (d) a predetermined maximum number of times; and (f) posting a secondary-actuator failure signal if the maximum number has been reached.

7. The method of claim 4 further comprising, if the maximum recorded gain is within a predetermined range, posting a secondary-actuator failure signal if the maximum recorded gain is at a recorded frequency outside a predetermined frequency range.

8. The method of claim 7 further comprising, if the maximum recorded gain is at a recorded frequency within said predetermined frequency range, modifying the parameters of the dual-stage controller from the recorded gains and corresponding frequencies.

9. The method of claim 8 further comprising posting a secondary-actuator failure signal if the dual-stage controller parameters have been modified more than a predetermined number of times within a predetermined time period.

10. The method of claim 4 further comprising recording the phases from each of the calculated secondary-actuator responses.

11. The method of claim 1 further comprising, after the single-stage controller has been selected and the head is track following but before generating the dynamic test signal:
generating a static test signal to the secondary actuator;
measuring the change in the VCM control signal in response to the static test signal to the secondary actuator;
calculating the stroke of the secondary actuator from the static test signal and the change in the VCM control signal;
posting a secondary-actuator failure signal if the calculated stroke is outside a predetermined stroke range; and
generating the dynamic test signal if the calculated stroke is within said predetermined stroke range.

12. The method of claim 1 wherein the disk drive includes a relative-position sensor for detecting the position of the secondary actuator relative to its neutral position, and further comprising, after the single-stage controller has been selected and the head is track following but before generating the dynamic test signal:
generating a static test signal to the secondary actuator;
receiving a relative-position signal (RPS) from the relative-position sensor in response to the static test signal;
calculating the stroke of the secondary actuator from the static test signal and the RPS;
posting a secondary-actuator failure signal if the calculated stroke is outside a predetermined stroke range; and
generating the dynamic test signal if the calculated stroke is within said predetermined stroke range.

13. The method of claim 1 further comprising, after the single-stage controller has been selected and the head is track following but before generating the dynamic test signal:
receiving a position error signal (PES) from the servo positioning information in the data track being followed;
posting a system error signal if the received PES is outside a predetermined acceptable range; and
generating the dynamic test signal if the received PES is within said predetermined acceptable range.

14. The method of claim 1 wherein the disk drive includes a relative-position sensor for detecting the position of the secondary actuator relative to its neutral position, and further comprising, after the single-stage controller has been selected and the head is track following but before generating the dynamic test signal:
receiving a relative-position signal (RPS) from the relative-position sensor while the data track is being followed; and
if the RPS is substantially different from zero, either generating the dynamic test signal, or alternatively, posting a secondary-actuator failure signal.

15. The method of claim 1 wherein the secondary actuator is an electrostatic microactuator.

16. The method of claim 1 wherein the secondary actuator is a piezoelectric actuator.

17. A method for operating a dual-stage actuator disk drive, the disk drive including (a) a rotatable magnetic recording disk having a plurality of concentric data tracks containing servo positioning information; (b) a recording head movable across the disk, the head being capable of reading data and servo positioning information in the data tracks; (c) a voice-coil-motor (VCM) for moving the head; (d) a secondary actuator connected to the VCM, the head being connected to the secondary actuator; and (e) a servo control processor responsive to servo information read by the head and comprising (i) a dual-stage controller for simultaneously generating a VCM control signal and a secondary-actuator control signal, and (ii) a selectable single-stage controller for generating only a VCM control signal, the processor-implemented method comprising:
selecting the single-stage controller if a potential failure of the secondary actuator is detected;
generating from the single-stage controller a VCM control signal to cause the head to follow a data track;
generating a series of dynamic test signals, each of the dynamic test signals in the series having a fixed frequency different from the other dynamic test signals in the series;
receiving, in response to each dynamic test signal in the series, a position error signal (PES) from the servo positioning information in the data track being followed;
calculating the response of the secondary actuator from the PES received for each dynamic test signal in the series by deconvolving the frequency response of the VCM from the PES to thereby calculate the frequency response of the secondary actuator;
recording the gains and corresponding frequencies from each of the calculated secondary-actuator responses; and
posting a secondary-actuator failure signal if the maximum recorded gain is outside a predetermined range.

18. The method of claim 17 further comprising, if the maximum recorded gain is within a predetermined range, posting a secondary-actuator failure signal if the maximum recorded gain is at a recorded frequency outside a predetermined frequency range.

19. The method of claim 17 further comprising:
calculating the coherence of the calculated frequency response of the secondary actuator for each dynamic test signal in the series;
calculating an average of the calculated coherences; and
posting a secondary-actuator failure signal if the average is less than a predetermined value.

20. The method of claim 17 further comprising, after the single-stage controller has been selected and the head is track following but before generating the dynamic test signal:
generating a static test signal to the secondary actuator;
measuring the change in the VCM control signal in response to the static test signal to the secondary actuator;
calculating the stroke of the secondary actuator from the static test signal and the change in the VCM control signal;
posting a secondary-actuator failure signal if the calculated stroke is outside a predetermined stroke range; and
generating the series of dynamic test signals if the calculated stroke is within said predetermined stroke range.

21. A magnetic recording disk drive comprising:
a rotatable magnetic recording disk having a plurality of concentric data tracks containing servo positioning information;
a recording head movable across the disk, the head being capable of reading data and servo positioning information in the data tracks;
a voice-coil-motor (VCM) for moving the head;
a secondary actuator connected to the VCM, the head being connected to the secondary actuator; and
a servo control processor responsive to servo information read by the head and comprising (i) a dual-stage controller for simultaneously generating a VCM control signal and a secondary-actuator control signal, (ii) a single-stage controller for generating only a VCM control signal, and (iii) a program of instructions readable by the processor for undertaking method acts comprising:
detecting a potential failure of the secondary actuator;
generating from the single-stage controller a VCM control signal to cause the head to follow a data track;
generating a series of dynamic test signals to the secondary actuator, each of the dynamic test signals in the series having a fixed frequency different from the other dynamic test signals in the series;
receiving, in response to each dynamic test signal in the series, a position error signal (PES) from the servo positioning information in the data track being followed;
calculating the response of the secondary actuator from the PES received for each dynamic test signal in the series by deconvolving the frequency response of the VCM from the PES to thereby calculate the frequency response of the secondary actuator;
recording the gains and corresponding frequencies from each of the calculated secondary-actuator responses; and
posting a secondary-actuator failure signal if the maximum recorded gain is outside a predetermined range.

22. The disk drive of claim 21 wherein the program includes instructions for undertaking method acts further comprising:
calculating the coherence of the calculated frequency response of the secondary actuator for each dynamic test signal in the series;
calculating an average of the calculated coherences; and
posting a secondary-actuator failure signal if the average is less than a predetermined value.

* * * * *